US012271999B2

(12) United States Patent
Frank et al.

(10) Patent No.: US 12,271,999 B2
(45) Date of Patent: Apr. 8, 2025

(54) SYSTEM AND METHOD OF SCANNING AN ENVIRONMENT AND GENERATING TWO DIMENSIONAL IMAGES OF THE ENVIRONMENT

(71) Applicant: FARO Technologies, Inc., Lake Mary, FL (US)

(72) Inventors: Aleksej Frank, Kornwestheim (DE); Matthias Wolke, Korntal-Münchingen (DE); Oliver Zweigle, Stuttgart (DE)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

(21) Appl. No.: 18/385,833

(22) Filed: Oct. 31, 2023

(65) Prior Publication Data

US 2024/0062462 A1 Feb. 22, 2024

Related U.S. Application Data

(60) Continuation of application No. 17/496,317, filed on Oct. 7, 2021, now Pat. No. 11,847,741, which is a
(Continued)

(51) Int. Cl.
*G06T 1/00* (2006.01)
*G06T 17/05* (2011.01)
(Continued)

(52) U.S. Cl.
CPC ............ *G06T 17/05* (2013.01); *G06T 1/0007* (2013.01); *H04N 13/282* (2018.05); *H04N 23/698* (2023.01)

(58) Field of Classification Search
CPC ..... G06T 1/0007; G06T 17/05; G06T 3/0031; H04N 13/282
(Continued)

(56) References Cited

U.S. PATENT DOCUMENTS 9,641,981 B2  5/2017  Steinbach et al.
9,739,886 B2  8/2017  Zweigle et al.
(Continued)

FOREIGN PATENT DOCUMENTS

EP      2913796 A1  9/2015
WO  2017/100658 A1  6/2017

OTHER PUBLICATIONS

Dall'Asta et al., A Comparison of Semiglobal and Local Dense Matching Algorithms for Surface Reconstruction. The International Archives of the Photogrammetry, Remote Sensing and Spatial Information Sciences, vol. XL-5, 2014 ISPRS Technical Commission V Symposium, Jun. 23-25, 2014, Riva del Garda, Italy, pp. 187-194.
Fathi et al., Automated sparse 3D point cloud generation of infrastructure using its distinctive visual features. Advanced Engineering Informatics. 2011;25:760-770.
Gao et al., A smartphone-based laser distance sensor for outdoor environments. IEEE International Conference on Robotics and Automation (ICRA). pp. 2922-2929, May 16-21, 2016.
(Continued)

*Primary Examiner* — Jeffery A Williams
(74) *Attorney, Agent, or Firm* — McCarter & English, LLP

(57) ABSTRACT

A system and method for scanning an environment and generating an annotated 2D map is provided. The method includes acquiring, via a 2D scanner, a plurality of 2D coordinates on object surfaces in the environment, the 2D scanner having a light source and an image sensor, the image sensor being arranged to receive light reflected from the object points. A first 360° image is acquired at a first position of the environment, via a 360° camera having a plurality of cameras and a controller, the controller being operable to merge the images acquired by the plurality of cameras to generate an image having a 360° view, the 360° camera being movable from the first to a second position. A 2D map is generated based at least in part on the plurality of two-dimensional coordinates of points. The first 360° image is integrated with the 2D map.

14 Claims, 24 Drawing Sheets

Related U.S. Application Data division of application No. 16/179,357, filed on Nov. 2, 2018, now Pat. No. 11,145,116.

(60) Provisional application No. 62/589,130, filed on Nov. 21, 2017.

(51) Int. Cl.
*H04N 13/282* (2018.01)
*H04N 23/698* (2023.01)

(58) Field of Classification Search
USPC ..................................................... 348/36, 37
See application file for complete search history.

(56) References Cited

U.S. PATENT DOCUMENTS

| | | | |
|---|---|---|---|
| 11,145,116 B2 | 10/2021 | Frank et al. | |
| 2007/0070069 A1* | 3/2007 | Samarasekera | G06F 3/011 707/E17.013 |
| 2013/0162665 A1 | 6/2013 | Lynch | |
| 2014/0043329 A1* | 2/2014 | Wang | G06T 17/20 345/420 |
| 2014/0253678 A1 | 9/2014 | Tocher et al. | |
| 2015/0029182 A1 | 1/2015 | Sun et al. | |
| 2016/0033643 A1* | 2/2016 | Zweigle | G05D 1/024 356/5.01 |
| 2016/0241836 A1 | 8/2016 | Cole et al. | |
| 2016/0291160 A1 | 10/2016 | Zweigle et al. | |
| 2017/0169604 A1 | 6/2017 | Van Der Zwan et al. | |
| 2017/0212911 A1 | 7/2017 | Abu-Alqumsan et al. | |
| 2017/0295309 A1* | 10/2017 | Cabral | H04N 23/71 |
| 2018/0285482 A1* | 10/2018 | Santos | G01C 15/008 |
| 2022/0101601 A1 | 3/2022 | Frank et al. | |

OTHER PUBLICATIONS

GeoSlam Ltd, Zeb-Revo Rt User's Manual v1.0.1. 80 pages, Jun. 1, 2017.

Gledhill et al., Panoramic imaging—a review. Computers & Graphics. 2003-27:435-445.

Nocerino et al., Investigation of indoor and outdoor performance of two portable mobile mapping systems. Proceedings of SPIE. 2017;10332:1033201-1-1033201-15.

Remondino et al., Dense image matching: comparisons and analyses. Dept. IEEE, pp. 47-54, (2013).

Rupnik et al., MicMac-a free, open-source solution for photogrammetry. Open Geospatial Data, Software and Standards. 2017;2(14):9 pages.

TIMMS: Fast, Accurate & Cost-Effective Indoor Mapping. TIMMS is a high-productivity tool for accurately measuring georeferencing and modeling interior spaces. Trimble. 8 pages, (2017).

Trimble Indoor Mobile Mapping Solution( TIMMS). The Optimal Fusion of Technologies for Capturing Spatial Data of Indoor and GNSS-Denied Spaces. Datasheet. 2 pages, (2017).

Tzavidas et al., A Multicamera Setup for Generating Stereo Panoramic Video. IEEE Transactions on Multimedia. Oct. 2005;7(5):880-890.

ViAmetris iMS2D, Continuous Building 2D Scanner for surveyors and topographers. 4 pages, (2018).

ViAmetris iMS3D Scanner. For the interior (and exterior*) of buildings is based on a unique technology without GPS (without GNSS) and shipping a IMU (Central Inertial Measurement Unit) for the Correct slopes and soil irregularities. 5 pages (2018).

European Office Action for Application No. 18207174.6, dated Feb. 10, 2020, 10 pages.

European Office Action for Application No. 18207174.6, dated Jan. 11, 2021, 9 pages.

European Office Action for Application No. 18207174.6, dated Apr. 3, 2019, 10 pages.

* cited by examiner

SYSTEM AND METHOD OF SCANNING AN ENVIRONMENT AND GENERATING TWO DIMENSIONAL IMAGES OF THE ENVIRONMENT

CROSS-REFERENCE TO RELATED APPLICATIONS

This application is a continuation application of U.S. patent application Ser. No. 17/496,317 filed Oct. 7, 2021, which is a divisional of U.S. patent application Ser. No. 16/179,357 filed Nov. 2, 2018, now U.S. Pat. No. 1,145,116, which claims the benefit of U.S. Provisional Application Ser. No. 62/589,130 filed Nov. 21, 2017, the disclosures of all of which are incorporated herein by reference in their entirety.

BACKGROUND

The present application is directed to a system that optically scans an environment, such as a building, and in particular to a portable system that generates two-dimensional floorplans of the scanned environment with integrated images or point cloud data.

The automated creation of digital two-dimensional floorplans for existing structures is desirable as it allows the size and shape of the environment to be used in many processes. For example, a floorplan may be desirable to allow construction drawings to be prepared during a renovation. Such floorplans may find other uses such as in documenting a building for a fire department or to document a crime scene.

Existing measurement systems typically use a scanning device that determines coordinates of surfaces in the environment by either: 1) emitting a light and capturing a reflection to determine a distance; or 2) by triangulation using cameras. These scanning device are mounted to a movable structure, such as a cart, and moved through the building to generate a digital representation of the building. These systems tend to be more complex and require specialized personnel to perform the scan. Further, the scanning equipment including the movable structure may be bulky, which could further delay the scanning process in time sensitive situations, such as a crime or accident scene investigation.

Accordingly, while existing scanners are suitable for their intended purposes, what is needed is a system for having certain features of embodiments of the present invention.

BRIEF DESCRIPTION

According to one aspect of the invention, a method of generating a two-dimensional (2D) image of an environment is provided. The method includes acquiring, via a 2D scanner, a plurality of 2D coordinates of points on surfaces in the environment, the 2D scanner having a light source and an image sensor, the image sensor being arranged to receive light reflected from the object points. A first 360° image is acquired at a first position of the environment, via a movable platform having a 360° camera, the 360° camera having a plurality of cameras and a controller, the controller being operable to merge the images acquired by the plurality of cameras to generate an image having a 360° view in a horizontal plane, the 360° camera being movable from the first position to a second position on the movable platform. A 2D map is generated based at least in part on the plurality of two-dimensional coordinates of points. The first 360° image is integrated with the 2D map.

According to another aspect of the invention, a method for scanning an environment and generating an annotated two-dimensional (2D) map is provided. The method includes determining, via a 2D scanner, a distance value to at least one of object points in the environment, the 2D scanner having a light source and an image sensor, the light source steering a beam of light to illuminate the object points, the image sensor being arranged to receive light reflected from the object points. A signal is generated, via the 2D scanner, in response a change in position or orientation of the 2D scanner. A first 360° images is generated, via a 360° camera having a plurality of cameras, a first 360° image having a 360° field of view in a horizontal plane. A 2D map of the environment is generated in response to an activation signal from an operator and based at least in part on the distance value and the signal. The 360° image is integrated with the 2D map at a location on the 2D map that corresponds to the location where the first 360° image was acquired. A point cloud is generated based at least in part on the acquisition of at least two 360° images.

According to another aspect of the invention, a non-transitory computer readable medium storing instructions is provided that, when executed by one or more processors of a system perform the steps of: acquiring, via a 2D scanner, a plurality of 2D coordinates of points on surfaces in the environment, the 2D scanner having a light source and an image sensor, the light source steering a beam of light to illuminate object points in the environment, the image sensor being arranged to receive light reflected from the object points; acquiring at a first position of the environment a first 360° image, via a movable platform having a 360° camera, the 360° camera having a plurality of cameras and a controller, the controller being operable to merge the images acquired by the plurality of cameras to generate an image having a 360° view in a horizontal plane, the 3D measurement device being movable from the first position to a second position on the movable platform; generating a 2D map based at least in part on the plurality of two-dimensional coordinates of points; and integrating the first 360° image with the 2D map.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a device that includes a system having a 2D scanner that works cooperatively with a mobile 360° camera to generate an annotated two-dimensional map of an environment. Other embodiments of the invention include a system having a 2D scanner and a mobile 360° camera the work cooperatively to generate a two-dimensional map and a point cloud of an environment.

Figure 1:
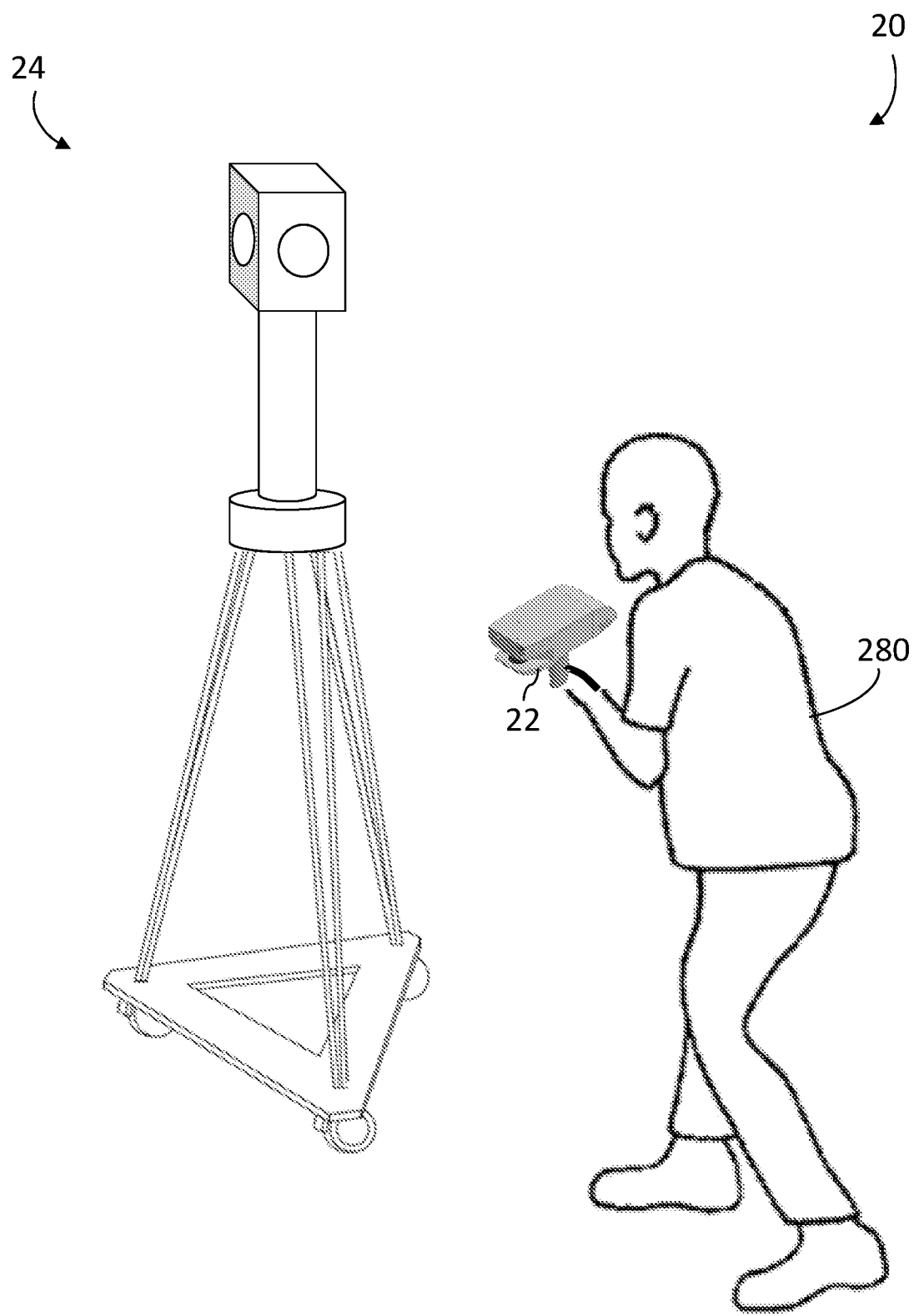
FIGS. 1-3 are perspective views of scanning and mapping systems in accordance with an embodiments.

Referring now to FIG. 1, an embodiment of a system 20 is shown for scanning an environment and generating an annotated two-dimensional (2D) map. The system 20 includes a two-dimensional (2D) scanner 22 and a three-dimensional (3D) measurement device 24. As will be discussed in more detail herein, in an embodiment, the 2D scanner 22 acquires two-dimensional coordinates of points on surfaces (e.g. walls) within the environment that may be used to generate a 2D map of the environment. In an embodiment, the 2D map is generated in real time using simultaneous localization and mapping. As will also be discussed in more detail herein, the 3D measurement device 24 includes a 360° camera that includes a plurality of cameras. The images acquired by the plurality of cameras may be merged to generate an image having a 360° field of view. In an embodiment, the 3D measurement device 24 may include a mobile platform that facilitates moving the 3D measurement device 24 between positions within the environment.

Figure 2:
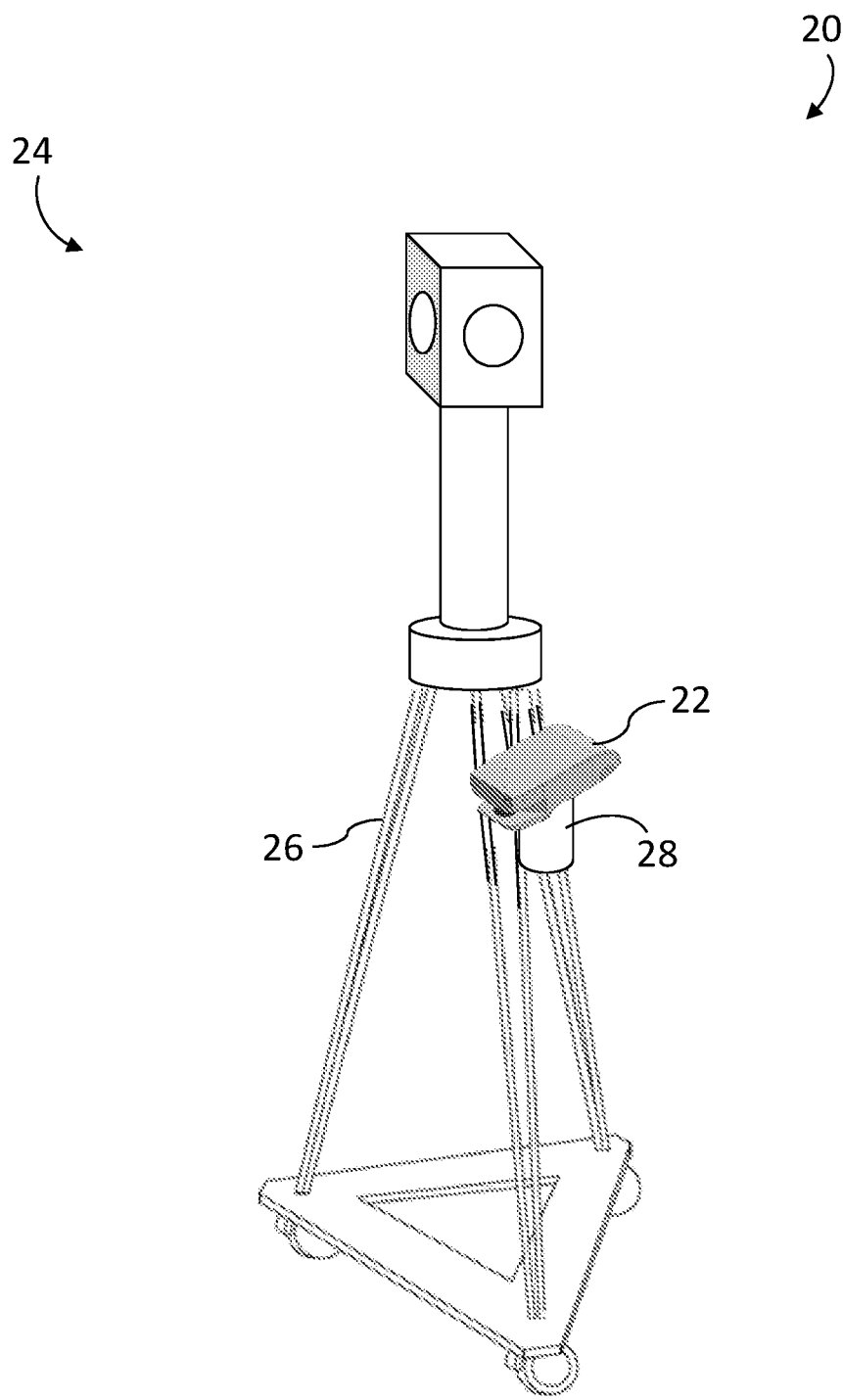
Figure 3:
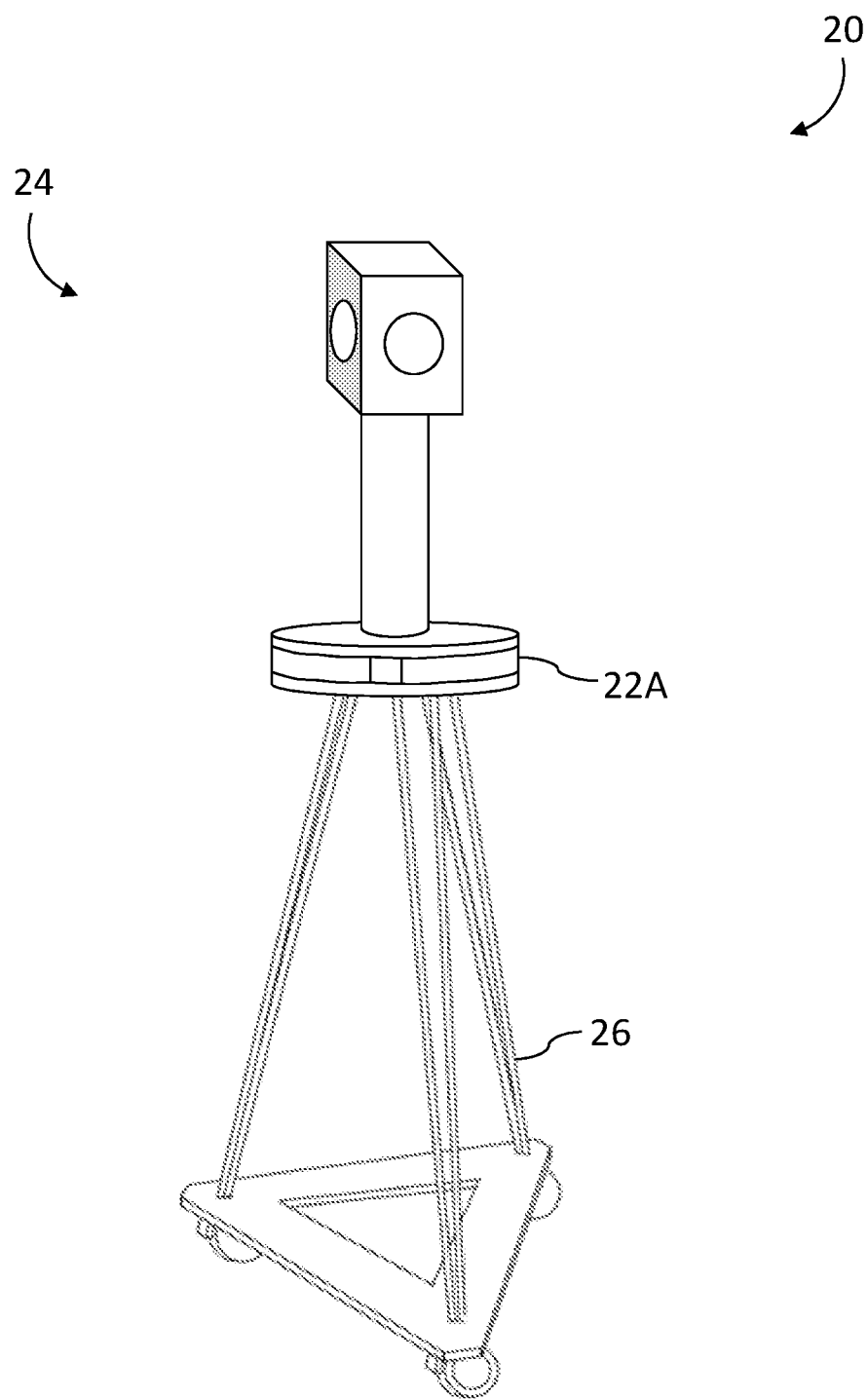
Figure 4:
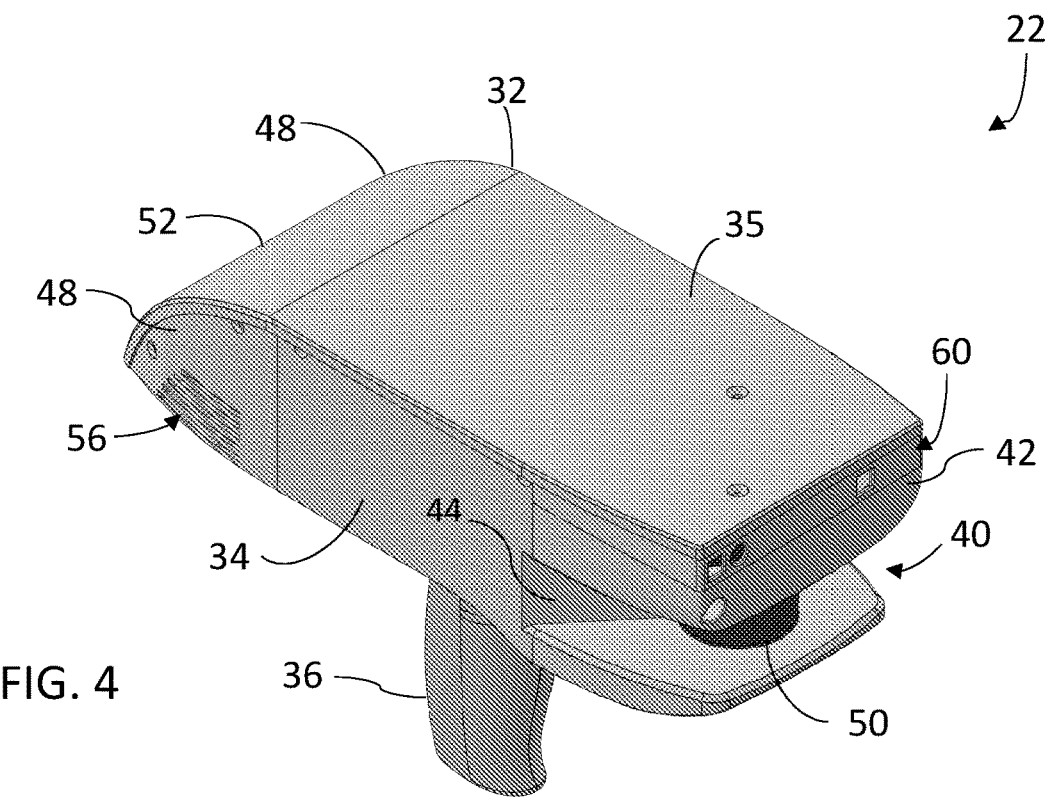
FIGS. 4-5 are perspective view of a handheld two-dimensional (2D) scanner for use in the system of FIG. 1 in accordance with an embodiment.

It should be appreciated that the 2D scanner 22 may be sized and weighted to be carried and operated by a single person. In other embodiments, such as the system 20 shown in FIG. 2, the 2D scanner 22 may be removably coupled to the 3D measurement device 24, such as to a framework 26 or a holder 28 for example. In still another embodiment, the system 20 includes a 2D scanner 22A that is fixed relative to the 3D measurement device 24. In an embodiment, the 2D scanner 22A may be similar to or the same as that described in commonly-owned U.S. Pat. No. 9,739,886, the contents of which are incorporated herein by reference.

Referring now to FIGS. 4-8, an embodiment is shown of the 2D scanner 22 of FIG. 1. In this embodiment, the 2D scanner 22 includes a housing 32 that includes a body portion 34 and a handle portion 36. The handle 36 may include an actuator 38 that allows the operator to interact with the 2D scanner 22. In the exemplary embodiment, the body 34 includes a generally rectangular center portion 35 with a slot 40 formed in an end 42. The slot 40 is at least partially defined by a pair walls 44, 46 that are angled towards a second end 48. As will be discussed in more detail herein, a portion of a two-dimensional scanner 50 is arranged between the walls 44, 46. The walls 44, 46 are angled to allow the scanner 50 to operate by emitting a light over a large angular area without interference from the walls 44, 46. As will be discussed in more detail herein, the end 42 may further include a three-dimensional camera or RGBD camera 60.

In the exemplary embodiment, the second end 48 is defined by a semi-cylindrical surface 52 and a pair of side walls 54. In an embodiment, the side walls 54 include a plurality of exhaust vent openings 56. The exhaust vent openings 56 are fluidly coupled to intake vent openings 58 arranged on a bottom surface 62 of center portion 35. The intake vent openings 58 allow external air to enter a conduit 64 having an opposite opening 66 (FIG. 6) in fluid communication with the hollow interior 67 of the body 34. In an embodiment, the opening 66 is arranged adjacent to a controller 68 which has one or more processors that is operable to perform the methods described herein. In an embodiment, the external air flows from the opening 66 over or around the controller 68 and out the exhaust vent openings 56.

The controller 68 is coupled to a wall 70 of body 34. In an embodiment, the wall 70 is coupled to or integral with the handle 36. The controller 68 is electrically coupled to the 2D scanner 50, the 3D camera 60, a power source 72, an inertial measurement unit (IMU) 74, a laser line projector 76, and a haptic feedback device 77.

Figure 9:
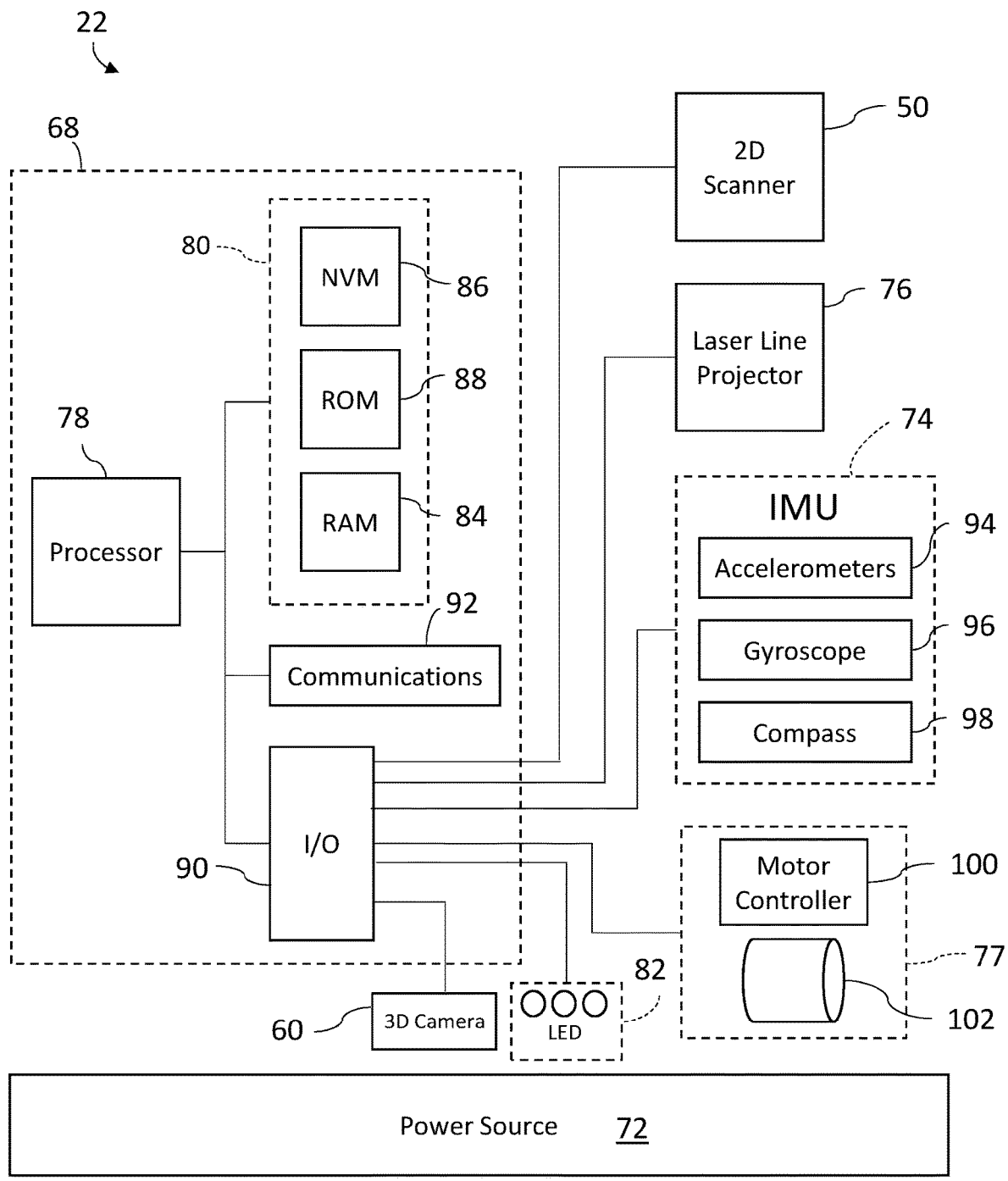
FIG. 9 is a schematic illustration of a 360° camera for use in the system of FIG. 1 in accordance with an embodiment.

Referring now to FIG. 9 with continuing reference to FIGS. 4-7, elements are shown of the system 30. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 is capable of converting the analog voltage or current level provided by 2D scanner 50, 3D camera 60 and IMU 74 into a digital signal to determine a distance from the system 30 to an object in the environment. Controller 68 uses the digital signals that act as input to various processes for controlling the system 30. The digital signals represent one or more system 30 data including but not limited to distance to an object, images of the environment, acceleration, pitch orientation, yaw orientation and roll orientation.

In general, controller 68 accepts data from 2D scanner 50 and IMU 74 and is given certain instructions for the purpose of generating a two-dimensional map of a scanned environment. Controller 68 provides operating signals to the 2D scanner 50, the 3D camera 60, laser line projector 76 and haptic feedback device 77. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user interface coupled to controller 68. The user interface may be one or more LEDs (light-emitting diodes) 82, an LCD (liquid-crystal diode) display, a CRT (cathode ray tube) display, or the like. A keypad may also be coupled to the user interface for providing data input to controller 68. In one embodiment, the user interface is arranged or executed on a mobile computing device that is coupled for communication, such as via a wired or wireless communications medium (e.g. Ethernet, serial, USB, Bluetooth™ or WiFi) for example, to the 2D scanner 22.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet(ˆ) Protocol), RS-232, ModBus, and the like. Additional 2D scanners 22 may also be connected to LAN with the controllers 68 in each of these 2D scanners 22 being configured to send and receive data to and from remote computers and other 2D scanner 22. The LAN may be connected to the Internet. This connection allows controller 68 to communicate with one or more remote computers connected to the Internet.

The processors 78 are coupled to memory 80. The memory 80 may include random access memory (RAM) device 84, a non-volatile memory (NVM) device 86, a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Figure 16:
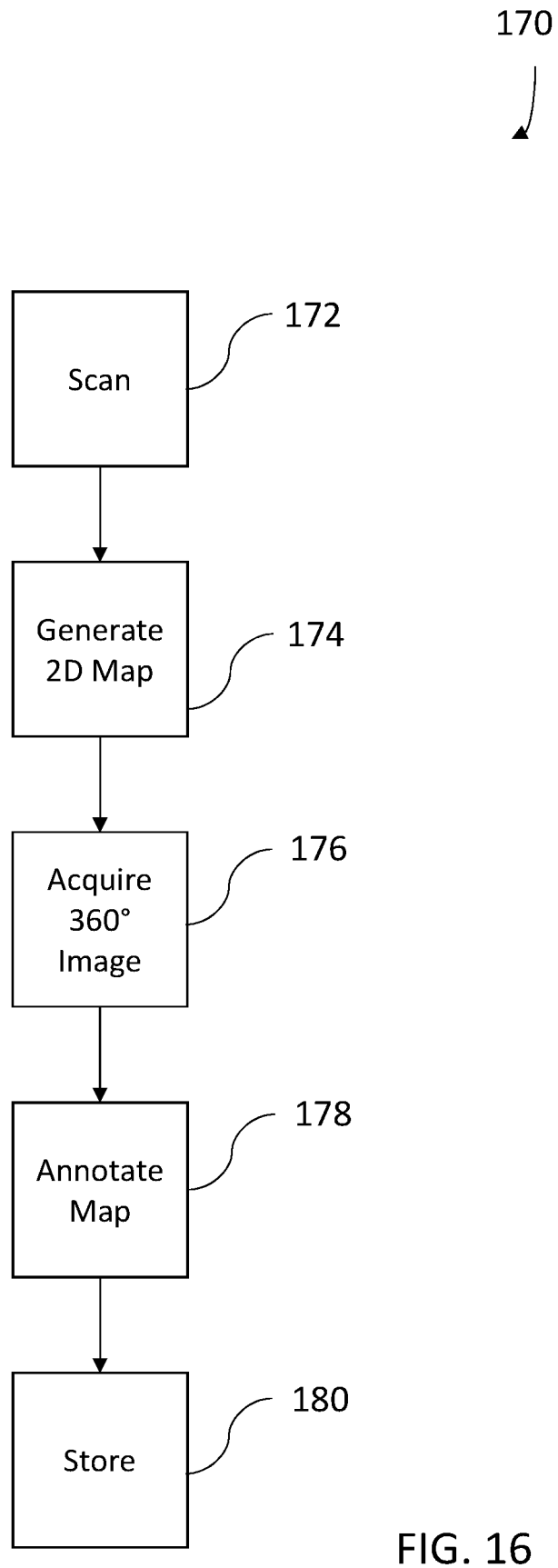
FIG. 16 is a flow diagram of a method of generating a 2D map with integrated panoramic images with the system of FIGS. 1-3 in accordance with an embodiment.
Figure 20:
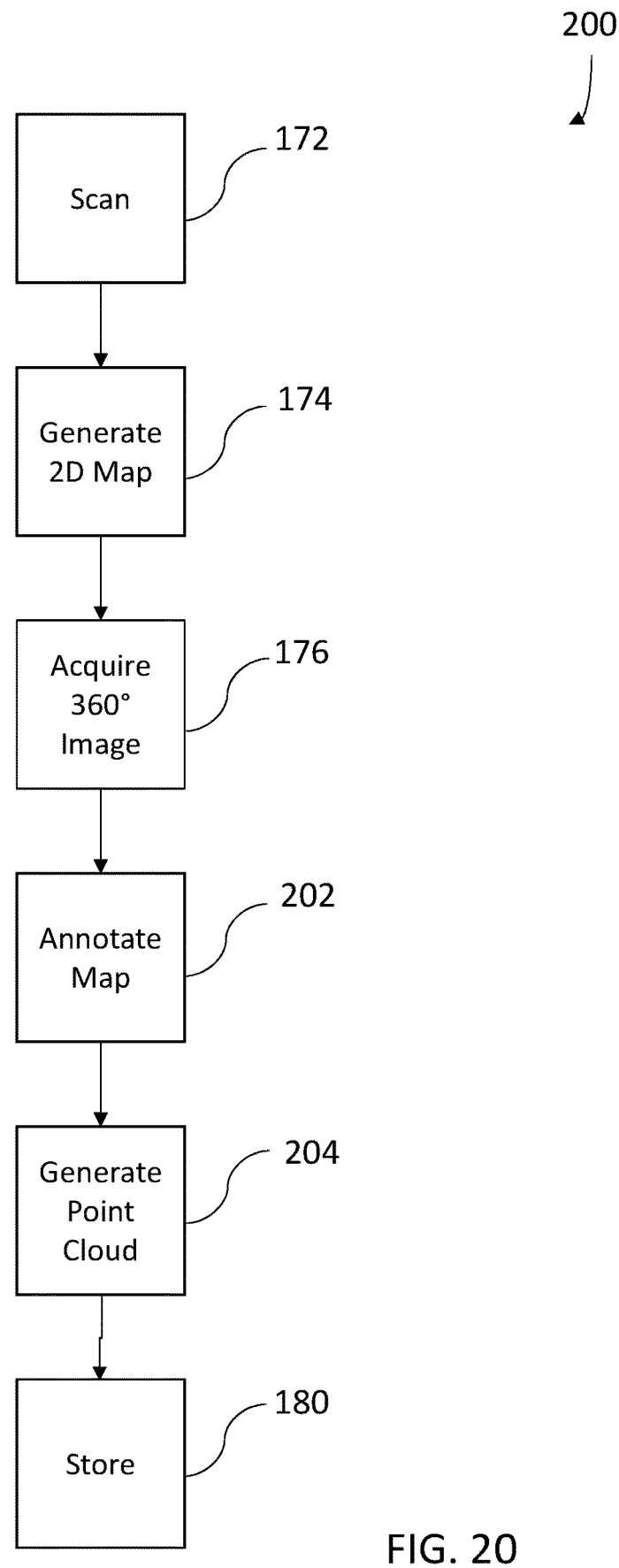
FIG. 20 is a flow diagram of a method of generating a two-dimensional map and a three-dimensional point cloud in accordance with an embodiment.
Figure 26:
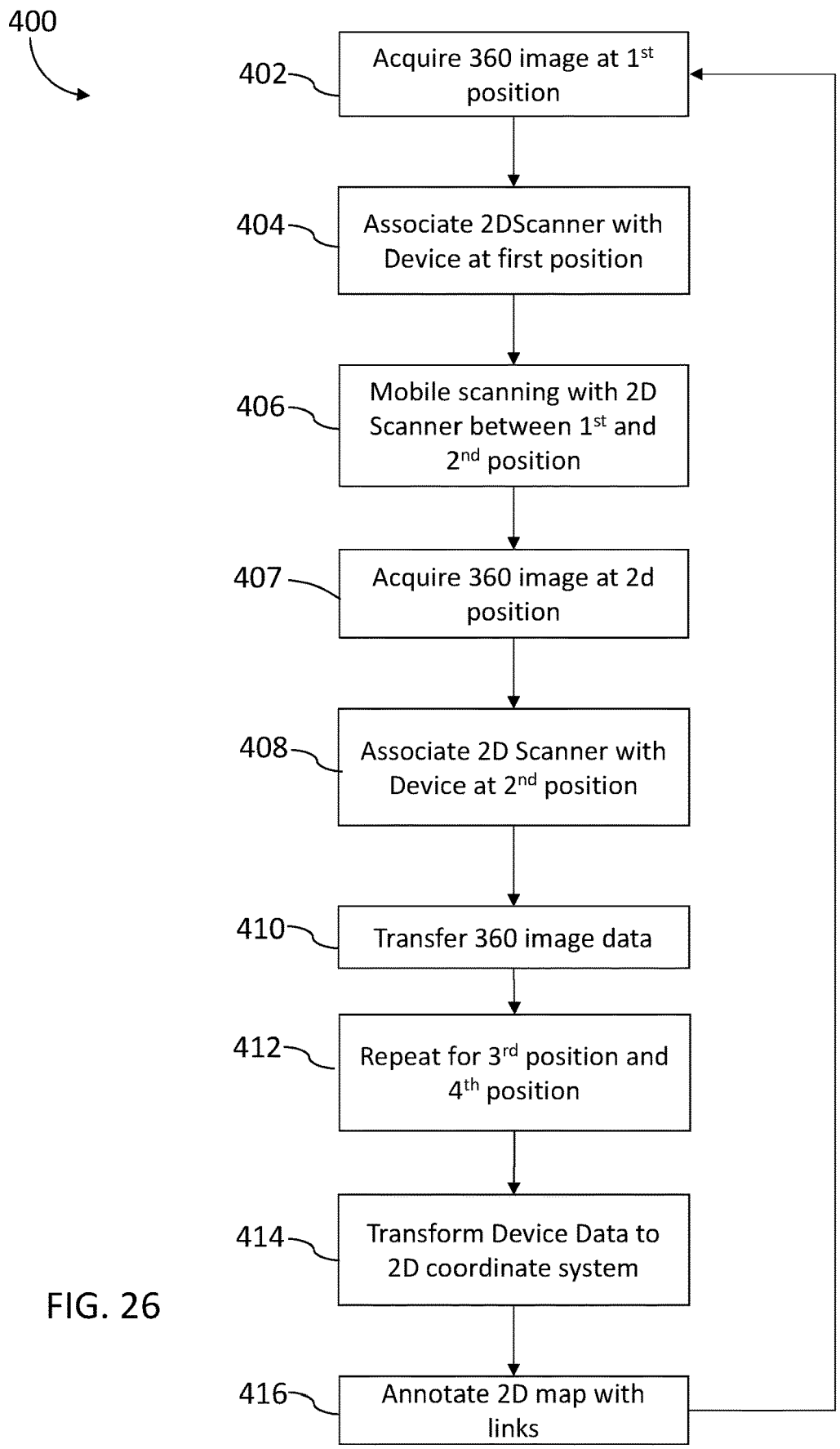
FIG. 26 is a flow diagram of a method of operating the system of FIG. 23.

Controller 68 includes operation control methods embodied in application code shown in FIG. 16, FIG. 20, and FIG. 26. These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C #, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 68 is the 2D scanner 50. The 2D scanner 50 measures 2D coordinates in a plane. In the exemplary embodiment, the scanning is performed by steering light within a plane to illuminate object points in the environment. The 2D scanner 50 collects the reflected (scattered) light from the object points to determine 2D coordinates of the object points in the 2D plane. In an embodiment, the 2D scanner 50 scans a spot of light over an angle while at the same time measuring an angle value and corresponding distance value to each of the illuminated object points.

Examples of 2D scanners 50 include, but are not limited to Model LMS100 scanners manufactured by Sick, Inc of Minneapolis, MN and scanner Models URG-04LX-UG01 and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D scanner 50 is oriented so as to scan a beam of light over a range of angles in a generally horizontal plane (relative to the floor of the environment being scanned). At instants in time the 2D scanner 50 returns an angle reading and a corresponding distance reading to provide 2D coordinates of object points in the horizontal plane. In completing one scan over the full range of angles, the 2D scanner returns a collection of paired angle and distance readings. As the 2D scanner 22 is moved from place to place, the 2D scanner 50 continues to return 2D coordinate values. These 2D coordinate values are used to locate the position of the system 30 thereby enabling the generation of a two-dimensional map or floorplan of the environment.

Also coupled to the controller 86 is the IMU 74. The IMU 74 is a position/orientation sensor that may include accelerometers 94 (inclinometers), gyroscopes 96, a magnetometers or compass 98, and altimeters. In the exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

In embodiment, the 2D scanner 22 further includes a 3D camera 60. As used herein, the term 3D camera refers to a device that produces a two-dimensional image that includes distances to a point in the environment from the location of system 30. The 3D camera 30 may be a range camera or a stereo camera. In an embodiment, the 3D camera 30 includes an RGB-D sensor that combines color information with a per-pixel depth information. In an embodiment, the 3D camera 30 may include an infrared laser projector 31 (FIG. 8), a left infrared camera 33, a right infrared camera 39, and a color camera 37. In an embodiment, the 3D camera 60 is a RealSense™ camera model R200 manufactured by Intel Corporation.

In the exemplary embodiment, the 2D scanner 22 is a handheld portable device that is sized and weighted to be carried by a single person during operation. Therefore, the plane 51 (FIG. 6) in which the 2D scanner 50 projects a light beam may not be horizontal relative to the floor or may continuously change as the computer moves during the scanning process. Thus, the signals generated by the accelerometers 94, gyroscopes 96 and compass 98 may be used to determine the pose (yaw, roll, tilt) of the 2D scanner 22 and determine the orientation of the plane 51.

In an embodiment, it may be desired to maintain the pose of the 2D scanner 22 (and thus the plane 51) within predetermined thresholds relative to the yaw, roll and pitch orientations of the 2D scanner 22. In an embodiment, a haptic feedback device 77 is disposed within the housing 32, such as in the handle 36. The haptic feedback device 77 is a device that creates a force, vibration or motion that is felt or heard by the operator. The haptic feedback device 77 may be, but is not limited to: an eccentric rotating mass vibration motor or a linear resonant actuator for example. The haptic feedback device is used to alert the operator that the orientation of the light beam from 2D scanner 50 is equal to or beyond a predetermined threshold. In operation, when the IMU 74 measures an angle (yaw, roll, pitch or a combination thereof), the controller 68 transmits a signal to a motor controller 100 that activates a vibration motor 102. Since the vibration originates in the handle 36, the operator will be notified of the deviation in the orientation of the 2D scanner 22. The vibration continues until the 2D scanner 22 is oriented within the predetermined threshold or the operator releases the actuator 38. In an embodiment, it is desired for the plane 51 to be within 10-15 degrees of horizontal (relative to the ground) about the yaw, roll and pitch axes.

Figure 10:
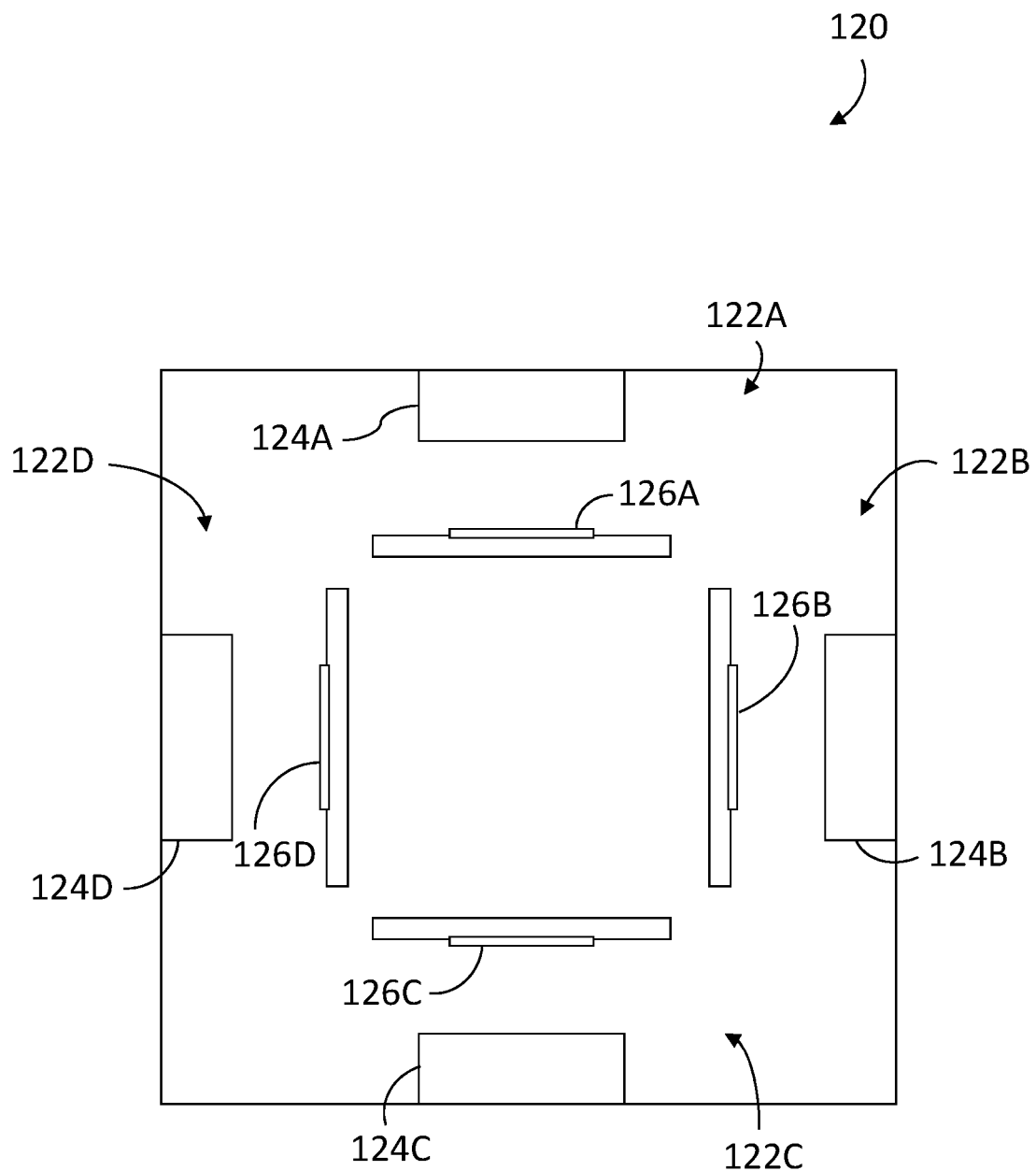
FIG. 10 is a schematic illustration of the 360° camera of FIG. 9 in accordance with an embodiment.
Figure 11:
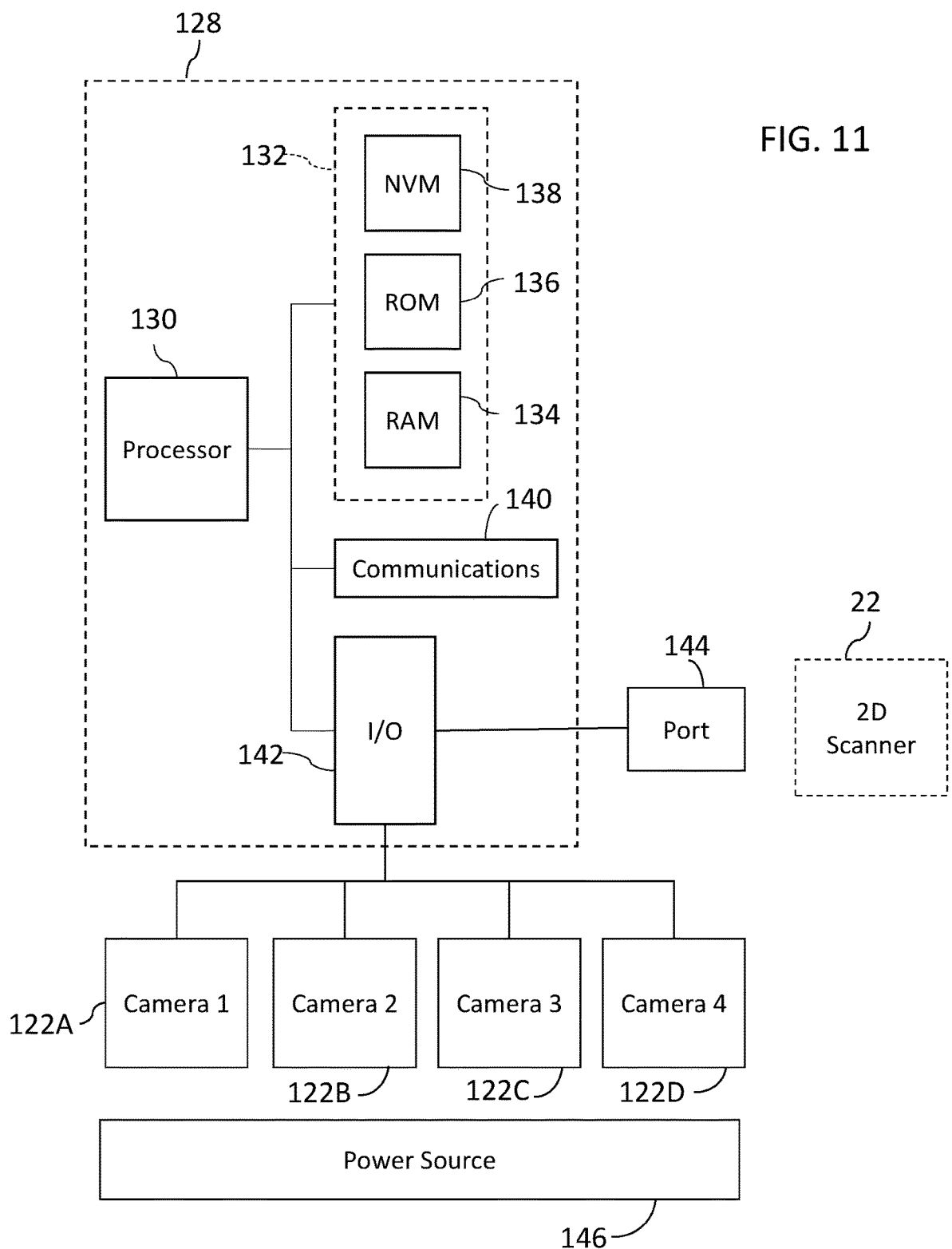
FIG. 11 is a schematic illustration of the 360° camera of FIG. 9 in accordance with an embodiment.

Referring now to FIGS. 10-11, an embodiment is shown of a 360° camera system 120 that may be used with the 3D measurement device 24 (FIG. 1). In an embodiment, the 360° camera system 120 is mounted to the frame work 26 to be spaced apart from the floor on which the 3D measurement device 24 is placed. The 360° camera system 120 includes a plurality of cameras 122A, 122B, 122C, 122D. The cameras 122A, 122B, 122C, 122D are oriented 90 degrees apart. It should be appreciated that the illustrated embodiment shows the 360° camera system 120 as having four cameras, this is for exemplary purposes and the claims should not be so limited. In other embodiments, the camera system 120 may have more or fewer cameras. For example, in one embodiment, the 360° camera system 120 may have two cameras having fisheye lenses that are positioned 180 degrees apart. Each camera 122A, 122B, 122C, 122D includes a lens system 124A, 124B, 124C, 124D, such as a wide angle lens for example. In an embodiment, the lenses 124A, 124B, 124C, 124D provide a 360° field of view of the environment around the 360° camera system 120. In an embodiment, the lens provide a 360°×180° field of view. Associated with each of the lenses 124A, 124B, 124C, 124D are an optical sensor or photosensitive array 126A, 126B, 126C, 126D. The photosensitive arrays 126A, 126B, 126C, 126D are arranged to receive light from the lenses 124A, 124B, 124C, 124D and acquire an image therefrom.

The photosensitive arrays 126A, 126B, 126C, 126D are electrically coupled to a controller 128 (FIG. 11) having a processor 130. As will be discussed in more detail herein, the processor 130 is responsive to executable computer instructions for merging the images acquired by the cameras 122A, 122B, 122C, 122D to generate a single 360° image, sometimes referred to as a panoramic image. The controller 128 further includes memory 132. The memory 132 may be comprised of random access memory 134, read-only memory 136 and nonvolatile memory 138. The controller 128 may further includes a communications circuit 140 that allows the controller 128 to communicate and exchange data with one or more remote computers or other 3D measurement devices 24. The communications circuit 140 may allow communication via wired (e.g. Ethernet) or wireless (e.g. Wifi, Bluetooth, etc.) communications protocols.

The controller 128 may further include and input/output (I/O) controller 142. In an embodiment, the I/O controller 142 provides an interface with the cameras 122A, 122B, 122C, 122D. The I/O controller 142 may further provide a connection to the 2D scanner 22 such as via a port 144 for example. The controller 128 may be connected to a power source 146, such as battery for example.

The controller 128 includes operational control methods embodied in application code. These methods are embodied in computer instructions written to be executed by processor 130, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C #, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

In an embodiment, the operation control methods include the merging of images acquired by the cameras 122A, 122B, 122C, 122D to generate a 360° image. In one embodiment 360° image is a 360° horizontal by 180° vertical image. In one embodiment the controller 128 causes the cameras 122A, 122B, 122C, 122D to acquire images of the environment simultaneously. Each of the cameras 122A, 122B, 122C, 122D acquires a 2D or planar image of the field of view of the respective camera. In an embodiment the individual 2D images are merged, sometimes colloquially referred to as "stitching", to define a single 360° image. In one embodiment 360° image is a 360° horizontal by 180° vertical image. The merging of the 2D images may include a projection of the 2D images onto a cylinder or a sphere. In some embodiment, distortions in the 2D image may be removed from the 360° image. The distortions may be caused by mapping spherical angles onto a rectangular grid, sometimes referred to as the "Mercator" problem. It should be appreciated that the terms 360° image or panoramic image may refer to images that include distortion and those in which the distortions have been removed.

Figure 12:
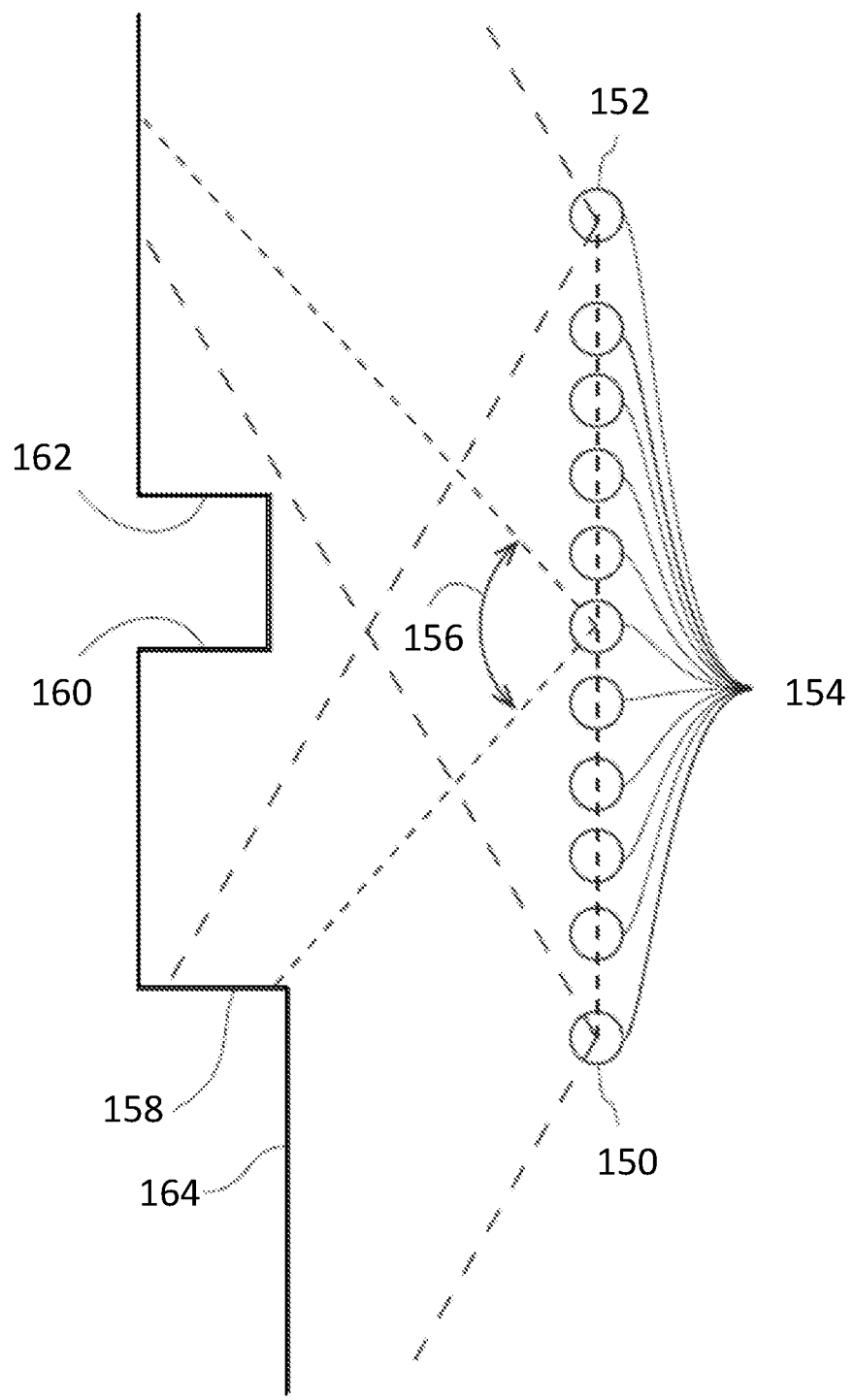
FIGS. 12-14 are plan views of stages of a two-dimensional map generated with the system of FIGS. 1-3 in accordance with an embodiment.
Figure 13:
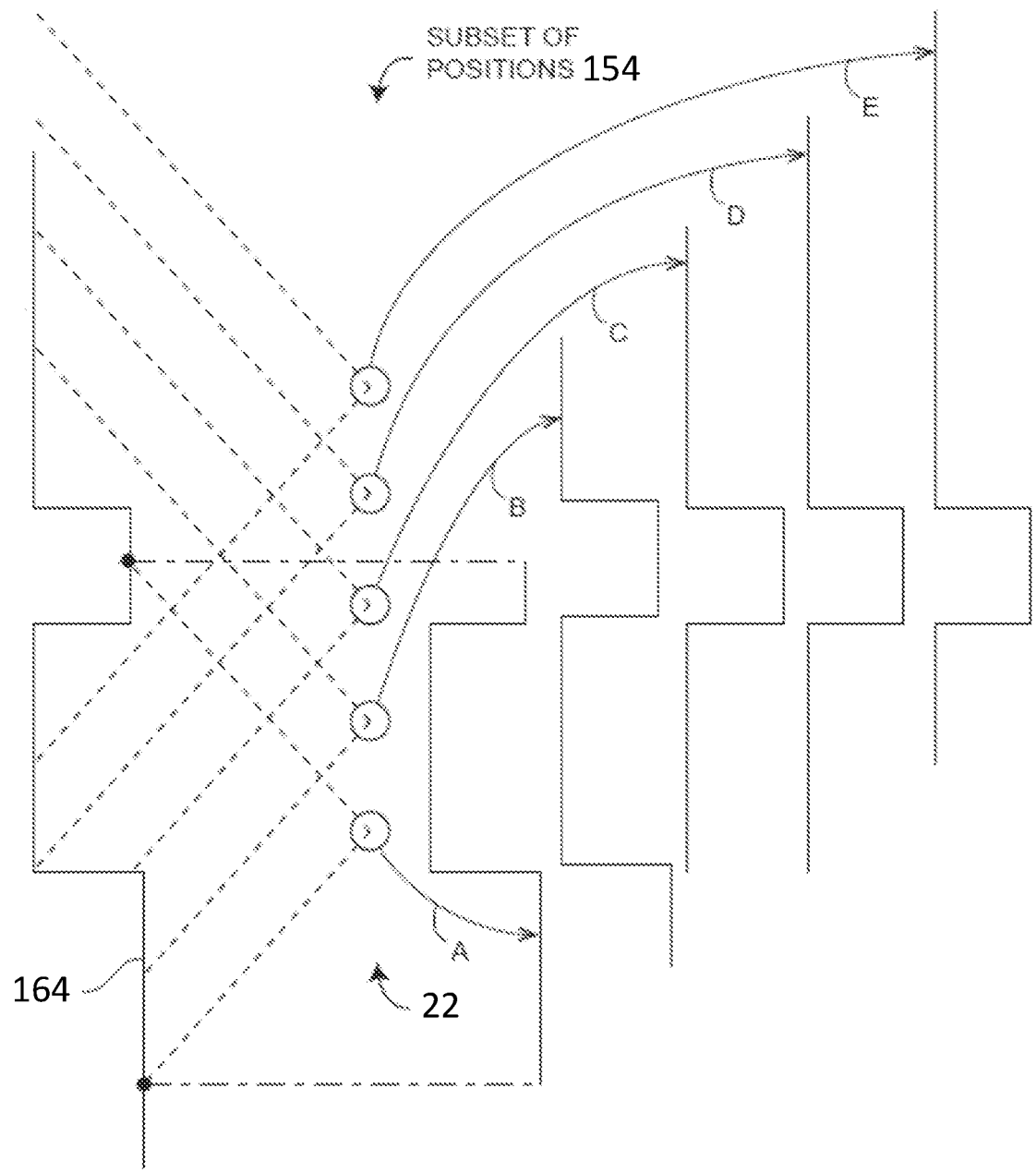
Figure 14:
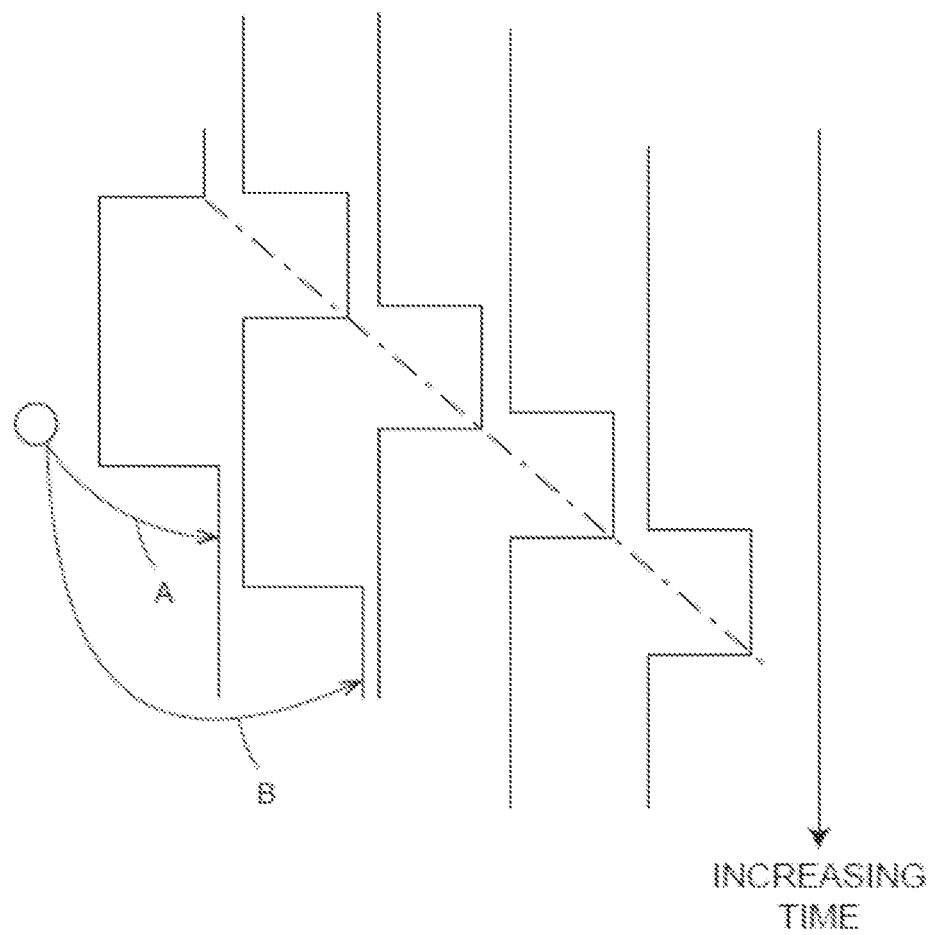
Figure 15:
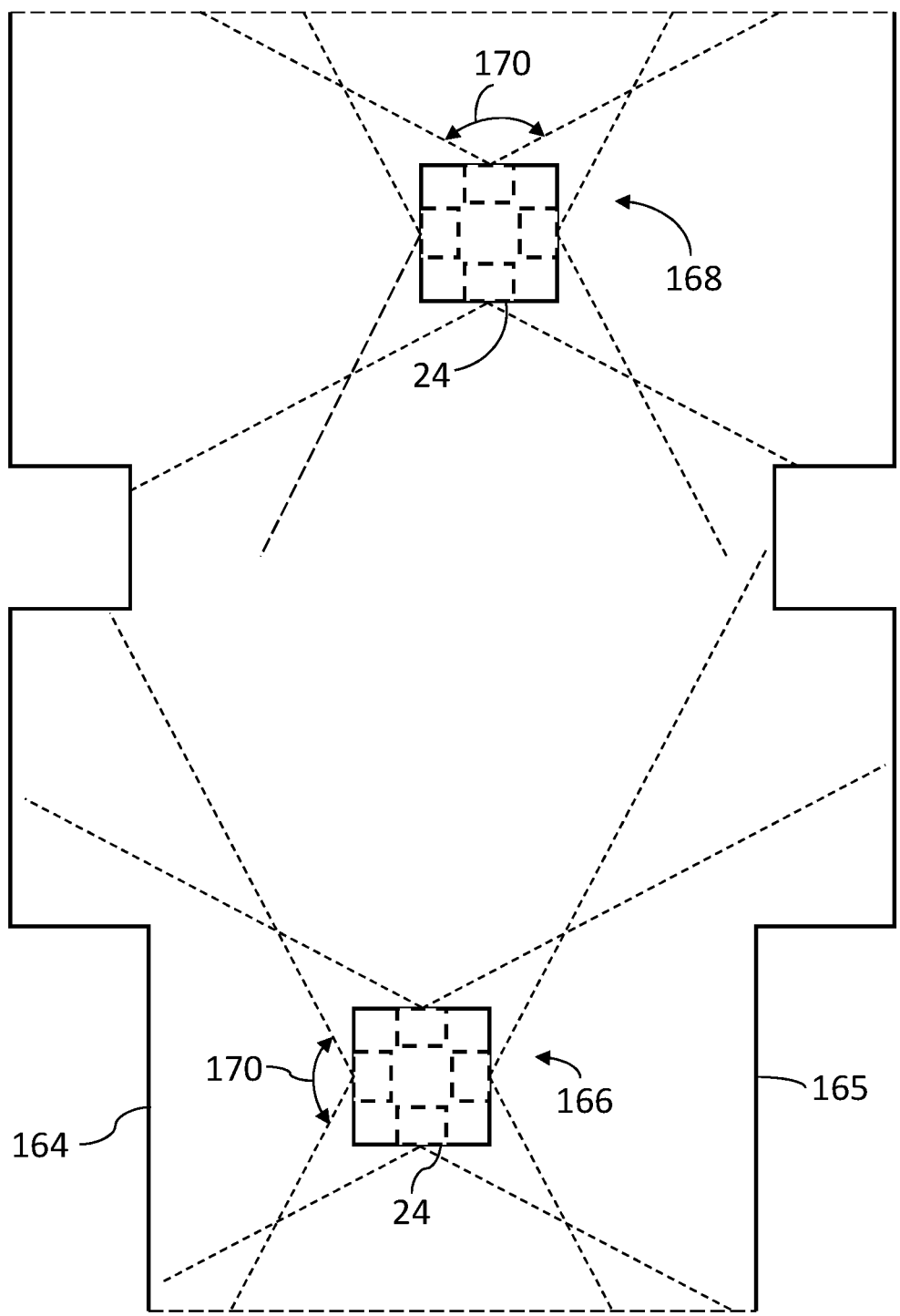
FIG. 15 is a plan view of stages of 360° image acquisition by the 360° camera of FIG. 9 in accordance with an embodiment.

Referring now to FIGS. 12-14, the operation of the 2D scanner 22 is shown. In an embodiment, the 2D scanner 50 makes measurements as the scanner 22 is moved about an environment, such from a first position 150 to a second registration position 152 as shown in FIG. 12. In an embodiment, 2D scan data is collected and processed as the scanner 22 passes through a plurality of 2D measuring positions 154. At each measuring position 154, the 2D scanner 50 collects 2D coordinate data over an effective FOV 156. Using methods described in more detail below, the controller 68 uses 2D scan data from the plurality of 2D scans at positions 154 to determine a position and orientation of the scanner 22 as it is moved about the environment. In an embodiment, the common coordinate system is represented by 2D Cartesian coordinates x, y and by an angle of rotation Crelative to the x or y axis. In an embodiment, the x and y axes lie in the plane of the 2D scanner and may be further based on a direction of a "front" of the 2D scanner 50.

FIG. 13 shows the scanner 22 collecting 2D scan data at selected positions 154 over an effective FOV 156. At different positions 154, the 2D scanner 50 captures a portion of the object 164 marked A, B, C, D, and E. FIG. 14 shows 2D scanner 50 moving in time relative to a fixed frame of reference of the object 164.

FIG. 13 includes the same information as FIG. 12 but shows it from the frame of reference of the scanner 22 rather than the frame of reference of the object 164. FIG. 13 illustrates that in the scanner 22 frame of reference, the position of features on the object change over time. Therefore, the distance traveled by the scanner 22 can be determined from the 2D scan data sent from the 2D scanner 50 to the controller 68.

As the 2D scanner 50 takes successive 2D readings and performs best-fit calculations, the controller 68 keeps track of the translation and rotation of the 2D scanner 50, which is the same as the translation and rotation of the scanner 22. In this way, the controller 68 is able to accurately determine the change in the values of x, y, B as the scanner 22 moves from the first position 150 to the second position 152.

In an embodiment, the controller 68 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 158, 160, 162 shown in FIG. 12. The mathematical criterion may involve processing of the raw data provided by the 2D scanner 50 to the controller 68, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane 51 of the light beam from 2D scanner 50 remains horizontal relative to the ground plane, the first translation value is dx, the second translation value is dy, and the first rotation value dθ. If the first scan data is collected with the 2D scanner 50 having translational and rotational coordinates (in a reference coordinate system) of $(x_1, y_1, \theta_1)$, then when the second 2D scan data is collected at a second location the coordinates are given by $(x_2, y_2, \theta_2) = (x_1+dx, y_1+dy, \theta_1+d\theta)$. In an embodiment, the controller 86 is further configured to determine a third translation value (for example, dz) and a second and third rotation values (for example, pitch and roll). The third translation value, second rotation value, and third rotation value may be determined based at least in part on readings from the IMU 74.

The 2D scanner 50 collects 2D scan data starting at the first position 150 and more 2D scan data at the second position 152. In some cases, these scans may suffice to determine the position and orientation of the 2D scanner 22 at the second position 152 relative to the first position 150. In other cases, the two sets of 2D scan data are not sufficient to enable the controller 68 to determine (with the desired accuracy) the first translation value, the second translation value, and the first rotation value. This problem may be avoided by collecting 2D scan data at intermediate scan positions 154. In an embodiment, the 2D scan data is collected and processed at regular intervals, for example, once per second. In this way, features in the environment are identified in successive 2D scans at positions 154. In an embodiment, when more than two 2D scans are obtained, the controller 68 may use the information from all the successive 2D scans in determining the translation and rotation values in moving from the first position 150 to the second position 152. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the 2D scanner 22 is moved beyond the second position 152, a two-dimensional image or map of the environment being scanned may be generated.

On a periodic or aperiodic basis, the measurement device 24 is moved from a first position 166 to a second position 168. At each position 166, 168, the controller 128 causes the cameras 122A, 122B, 122C, 122D to acquire images within each of the respective fields of view 170. This plurality of images are subsequently merged together to define a 360° image associated with that position. As will be discussed in more detail herein, the 360° image may be integrated with or otherwise linked in a 2D map generated from the 2D coordinate data generated by the scanner 22.

As discussed in more detail herein, in one embodiment, the first 360° image acquired at the first position 166 and the second 360° image acquired at second position 168 are used to define 3D coordinates of points on surfaces of the objects 164, 165 via photogrammetry (i.e. generate a point cloud).

Figure 5:
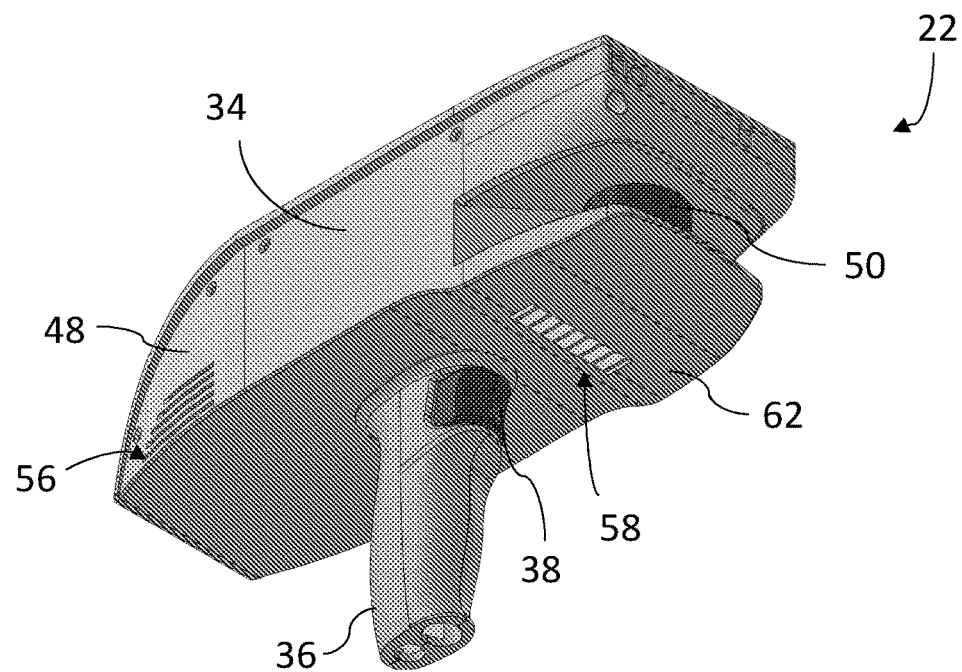
Figure 6:
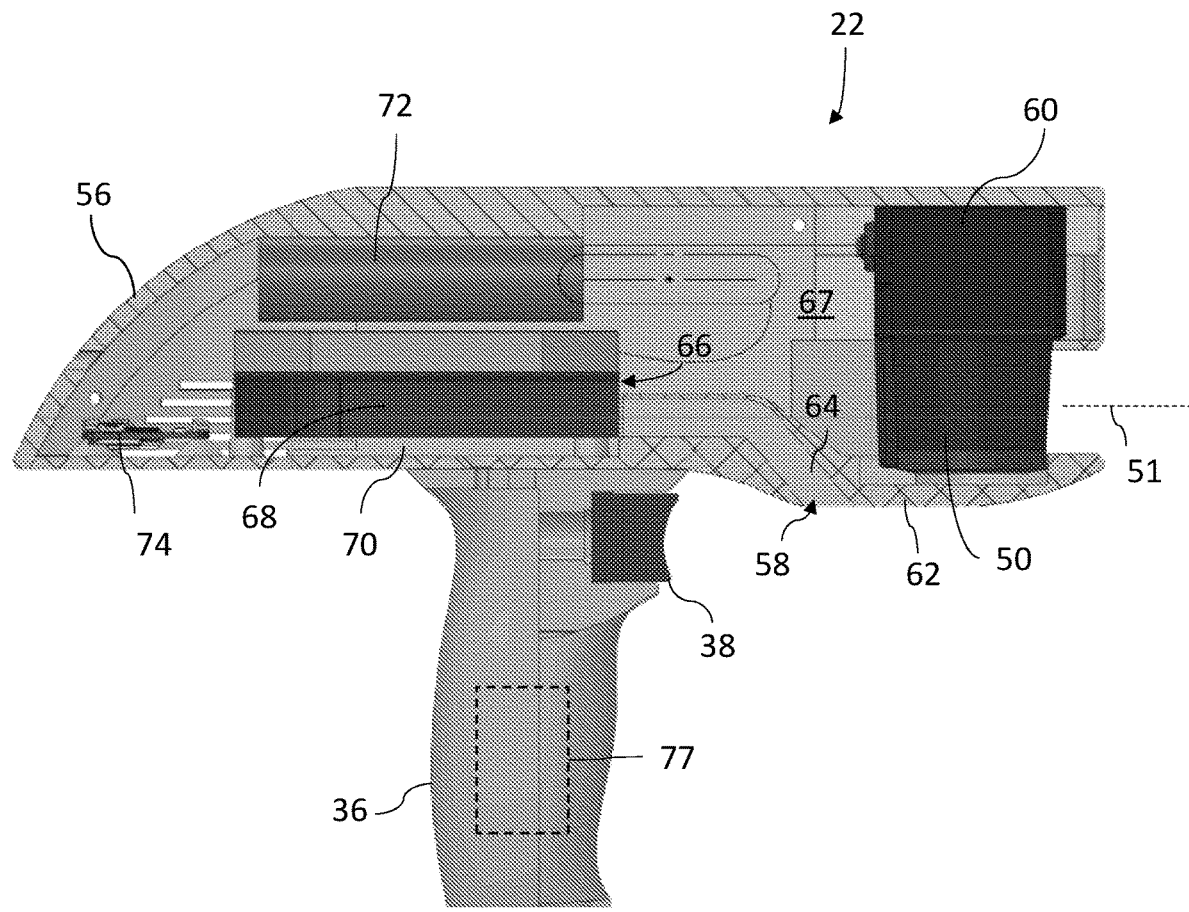
FIG. 6 is a side sectional view of the 2D scanner of FIG. 4 in accordance with an embodiment.
Figure 7:
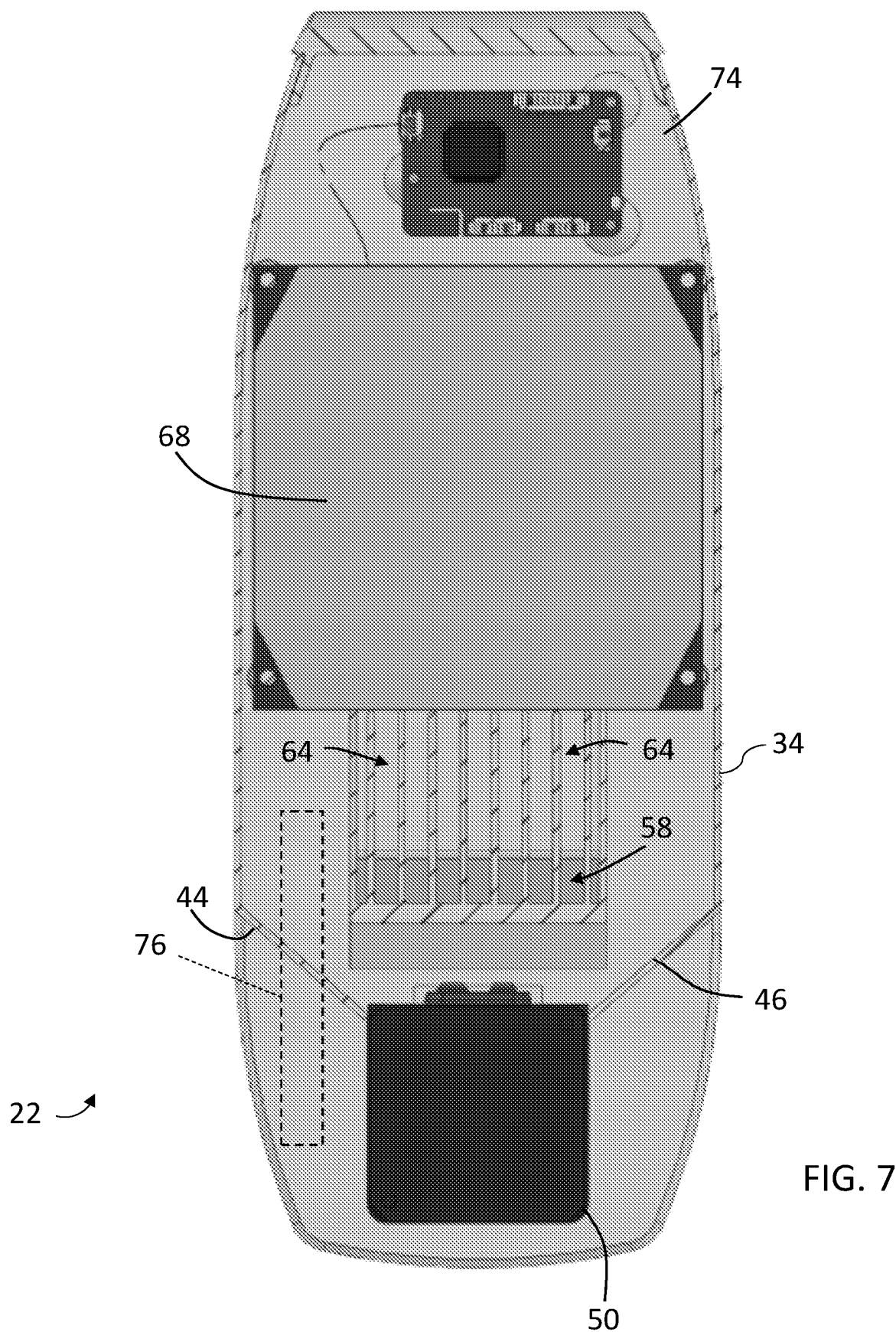
FIG. 7 is a second section view of the 2D scanner of FIG. 4 in accordance with an embodiment.
Figure 8:
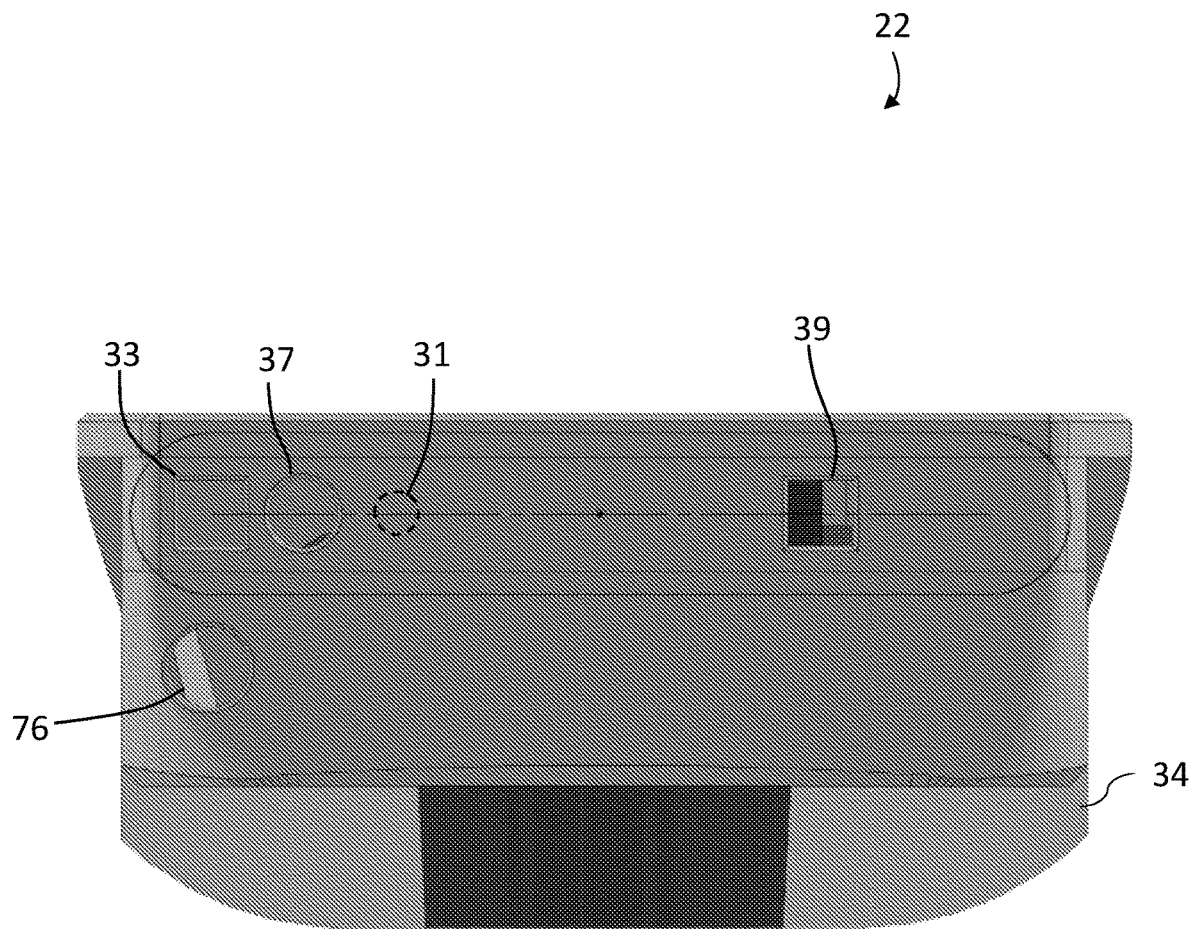
FIG. 8 is an end view of the 2D scanner of FIG. 4 in accordance with an embodiment.
Figure 17:
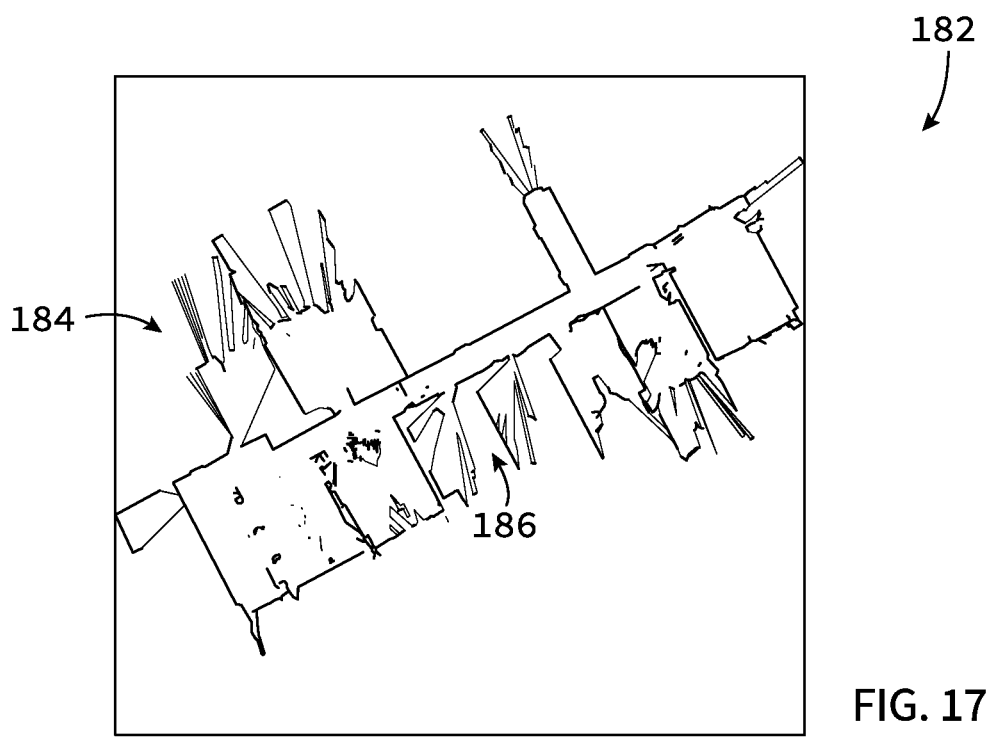
FIGS. 17-18 are two dimensional maps generated by the method of FIG. 16.

Referring now to FIG. 16, method 170 is shown for generating 2D maps of an environment that are annotated with 360° images. The method 170 starts in block 172 where the facility or area is scanned to acquire scan data 182, such as that shown in FIG. 17. The scanning is performed by carrying the 2D scanner 22 through the area to be scanned. The 2D scanner 22 measures distances from the 2D scanner 22 to an object, such as a wall for example, and also a pose of the 2D scanner 22 in an embodiment the user interacts with the 2D scanner 22 via actuator 38 (FIG. 5). In other embodiments, a mobile computing device (e.g. cellular phone) provides a user interface that allows the operator to initiate the functions and control methods described herein. Using the registration process desired herein, the two dimensional locations of the measured points on the scanned objects (e.g. walls, doors, windows, cubicles, file cabinets etc.) may be determined. It is noted that the initial scan data may include artifacts, such as data that extends through a window 184 or an open door 186 for example. Therefore, the scan data 182 may include additional information that is not desired in a 2D map or layout of the scanned area.

Figure 18:
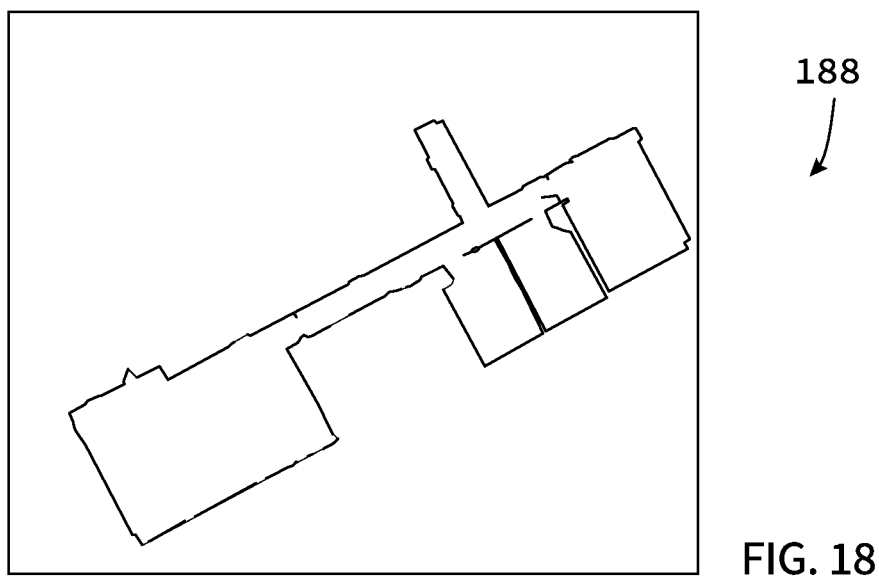
Figure 19:
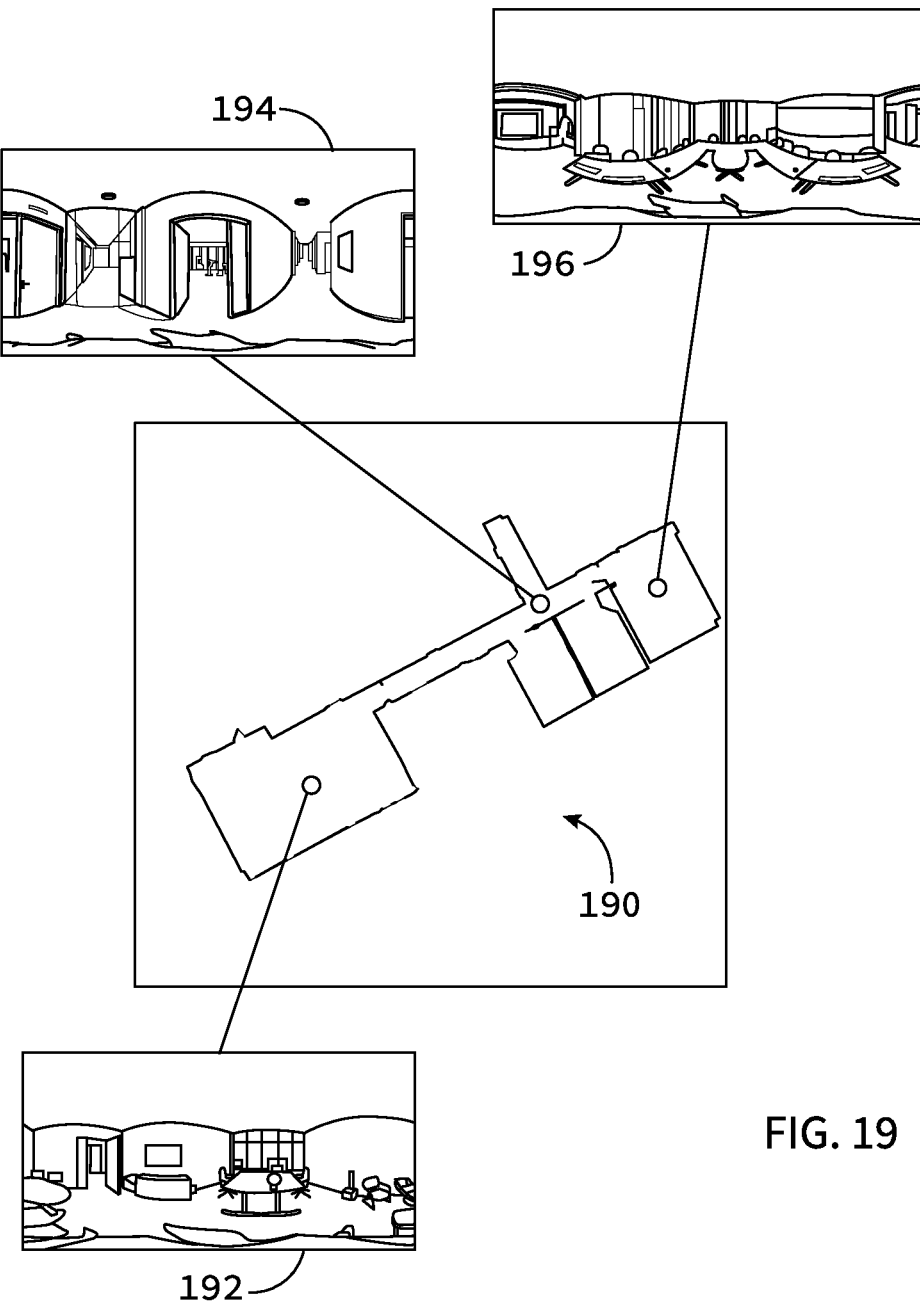
FIG. 19 is an illustration of an annotated two-dimensional map generated with the method of FIG. 16 that includes 360° images in accordance with an embodiment.

The method 170 then proceeds to block 174 where a 2D map 188 is generated of the scanned area as shown in FIG. 18. The generated 2D map 188 represents a scan of the area, such as in the form of a floor plan without the artifacts of the initial scan data. It should be appreciated that the 2D map 188 may be utilized directly by an architect, interior designer or construction contractor as it represents a dimensionally accurate representation of the scanned area. The method 170 then proceeds to block 176 where the 360° images are acquired by moving the measurement device 24 through the environment. In an embodiment, the position of the measurement device 24 when the images are acquired is determined by matching planes in the 360° image with the lines on the 2D map 188. In another embodiment, the position of the measurement system 24 is registered by the 2D scanner 22. The method 170 then proceeds to block 178 where 360° image annotations are made to the 2D maps 188 to define an annotated 2D map 190 (FIG. 19) that includes information, such as the 360° images 192, 194, 196. It should be appreciated that the 360° images may be integrated directly onto the 2D map 190 or may be a link such as a hyperlink that allows the 360° images to be opened in viewing software or in a wearable device, such as virtual reality glasses or goggles. In an embodiment, when the operator selects a link in the 2D map, the viewing software initiates operation by displaying the point cloud (or a rendered version thereof) at the location of the link in the 2D map.

In some geographic regions, public safety services such as fire departments may keep records of building or facility layouts for use in case of an emergency as an aid to the public safety personnel in responding to an event. It should be appreciated that these annotations may be advantageous in alerting the public safety personnel to potential issues they may encounter when entering the facility, and also allow them to quickly locate egress locations.

Once the annotations of the 2D annotated map 190 are completed, the method 170 then proceeds to block 180 where the 2D annotated map 190 is stored in memory, such as nonvolatile memory 80 for example. The 2D annotated map 190 may also be stored in a network accessible storage device or server so that it may be accessed by the desired personnel.

Figure 21:
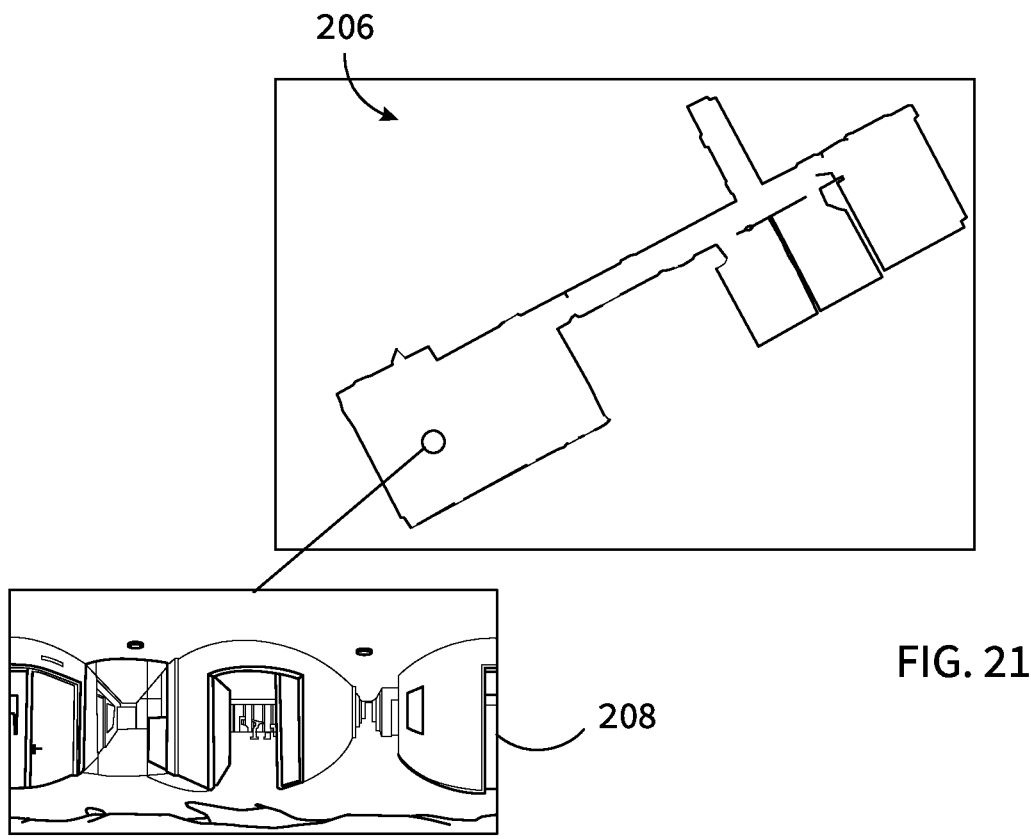
FIG. 21 is an illustration of an annotated two-dimensional map generated with the method of FIG. 19 in accordance with an embodiment.

Referring now to FIG. 20, a method 200 of acquiring a 2D map of an environment and generating a point cloud with the system 20 is shown. The method 200 is similar to method 170 described herein. The method 200 begins with a scan of the environment in block 172 to acquire 2D data of the environment with scanner 22. The method 200 then proceeds to block 174 where a 2D map, such as map 206 (FIG. 21) for example, is generated from the 2D data acquired by 2D scanner 22. With the 2D data acquired, or simultaneously with the acquisition of the 2D data, the method 200 acquires a plurality of 360° images in block 176. It should be appreciated that since the 360° images will be used in a photogrammetry process, the positions are selected for the 360° images so that there is some overlap or common structural portions between adjacent 360° images. This allows, via photogrammetry, for features in the images to be triangulated and three dimensional coordinates to be determined.

The method 200 then proceeds to block 202 where the 2D map, such as map 206 for example, is annotated. The map may be annotated with 360° images 208. The method 200 then proceeds to block 204 where a point cloud of the environment is generated. As used herein, a "point cloud" is a collection of a plurality of 3D coordinates that define points of space in the environment. A point cloud may be used, for example, to generate a virtual image of the environment. In some embodiments, color information for the location of the 3D coordinates in the environment is also associated with the respective 3D coordinate in the point cloud.

In an embodiment, the 3D coordinates are generated using photogrammetry. Photogrammetry is a process of determining 3D coordinates using triangulation based at least in part on features common between two images. In some embodiments, the photogrammetry process uses dense image matching. Dense image matching allows for the extraction of 3D surface coordinates at a higher density than traditional photogrammetry techniques.

Dense image matching processes may include so called local methods or global methods. Local dense image mapping evaluates correspondences one point at a time without considering neighboring points. With global dense image mapping a constraint is placed on the regularity of the results during the estimation. Further, in some embodiments, a semi-global matching process may be used which realizes a pixel-wise matching through application of consistency of constraints with a cost function. Available dense image matching processes include MICMAC distributed by the French Geographical Institute and OpenCV distributed by opencv.org. Commercially available dense image mapping may be performed by PhotoScan distributed by Agisoft, LLC of St. Petersburg, Russia.

Figure 22:
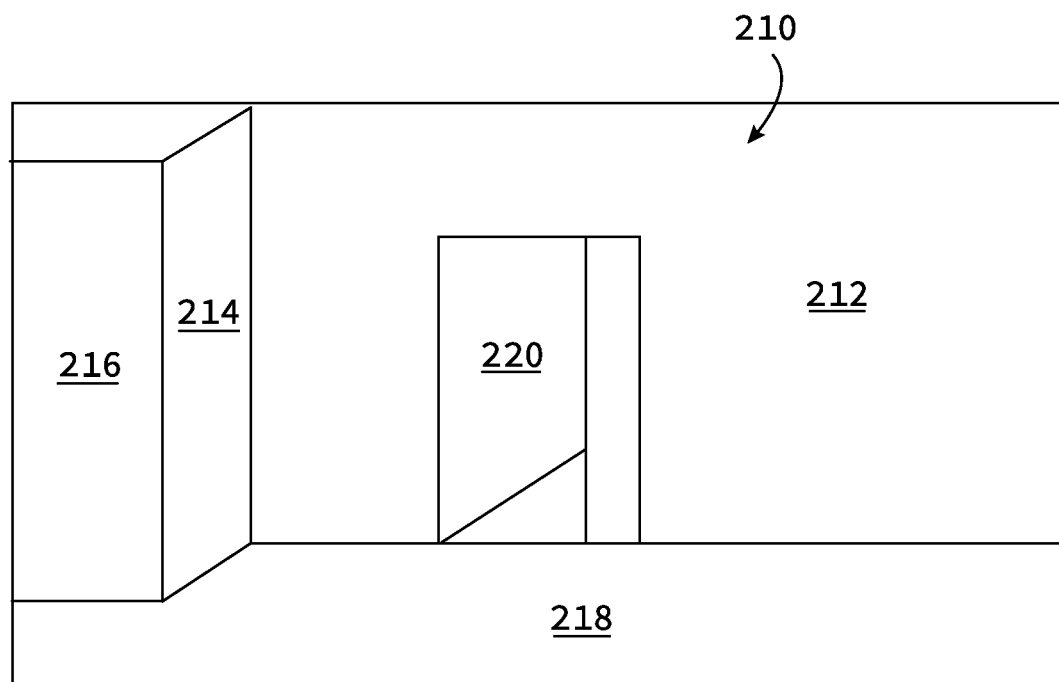
FIG. 22 is an illustration of a display of virtual environment generated from panoramic images acquired during a scan by the system of FIGS. 1-3 in accordance with an embodiment.

Once the point cloud is generated via photogrammetry, the 2D map 206 may be annotated to include a link, such as a hyperlink, to the point cloud data. In an embodiment, the operator may access the point cloud data from the 2D map 206 by clicking on a link (such as an icon) and being given the option of opening a 360° image 208 or opening the point cloud. It should be appreciated that the point cloud is represented as a collection of points in space that correspond to the 3D coordinates. In an embodiment, visualization software presents a rendered image 210 (FIG. 22) of the point cloud so that the surfaces in the image, such as surfaces 212, 214, 216, 218, 220 for example, appear to be solid. In an embodiment, the image 210 is transmitted to a virtual reality headset allowing the operator to view the point cloud in three-dimensions.

With the 2D map 206 annotated with the point cloud, the method 200 proceeds to block 180 where the 2D annotated map 190 is stored in memory, such as nonvolatile memory 80 for example. The 2D annotated map 190 may also be stored in a network accessible storage device or server so that it may be accessed by the desired personnel.

It should be appreciated that while embodiments herein refer to annotating the 2D map 188, 206 with 360° images or point cloud links, the maps 188, 206 may further be annotated with other data including user-defined annotations (e.g. dimensions or room size), free-form text, hyperlinks, 2D or planar images, or recorded audio notes.

Figure 23:
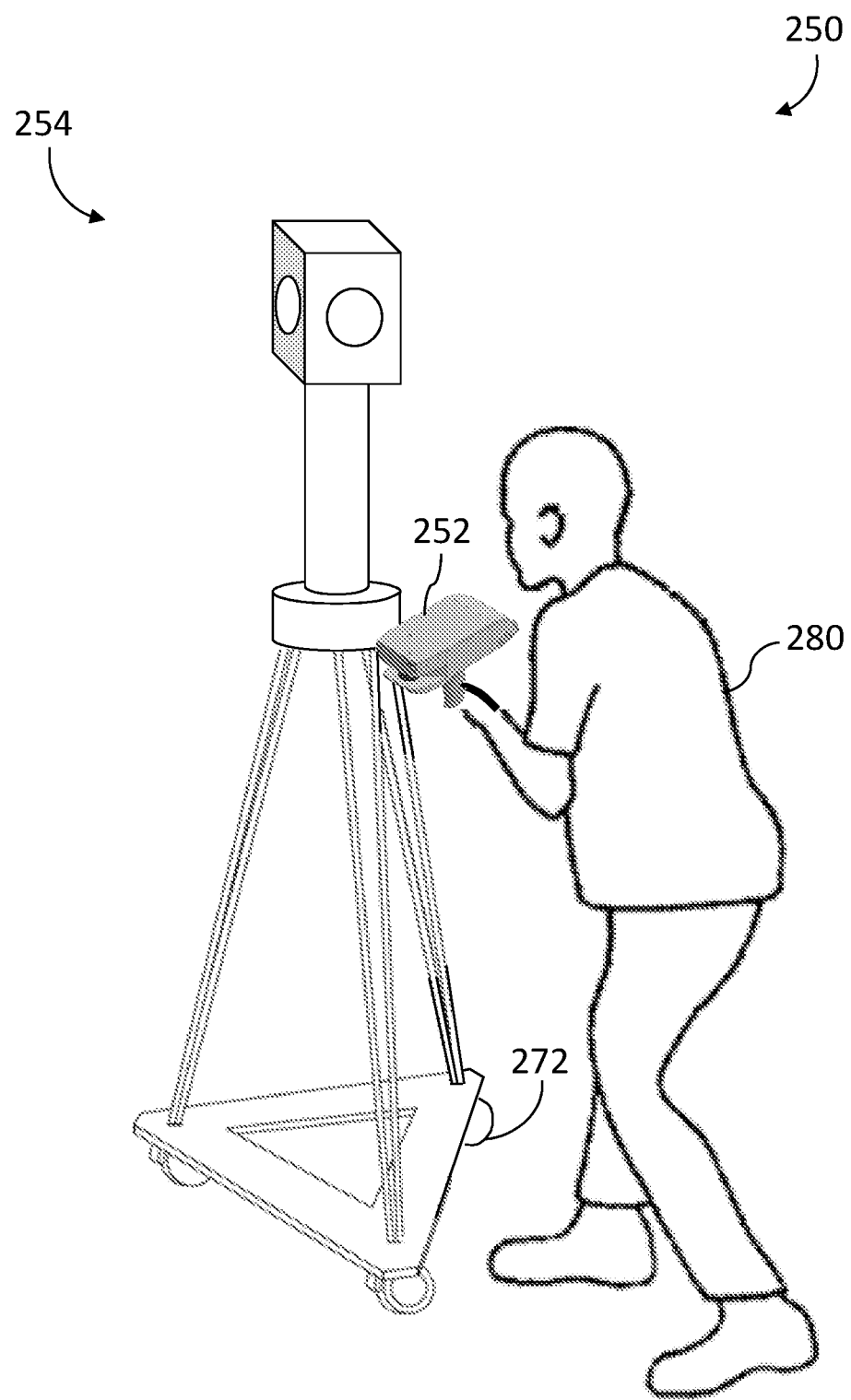
FIG. 23 is a perspective view of the system of FIG. 1 illustrating a registration of a mobile panoramic device to the 2D scanner.
Figure 24:
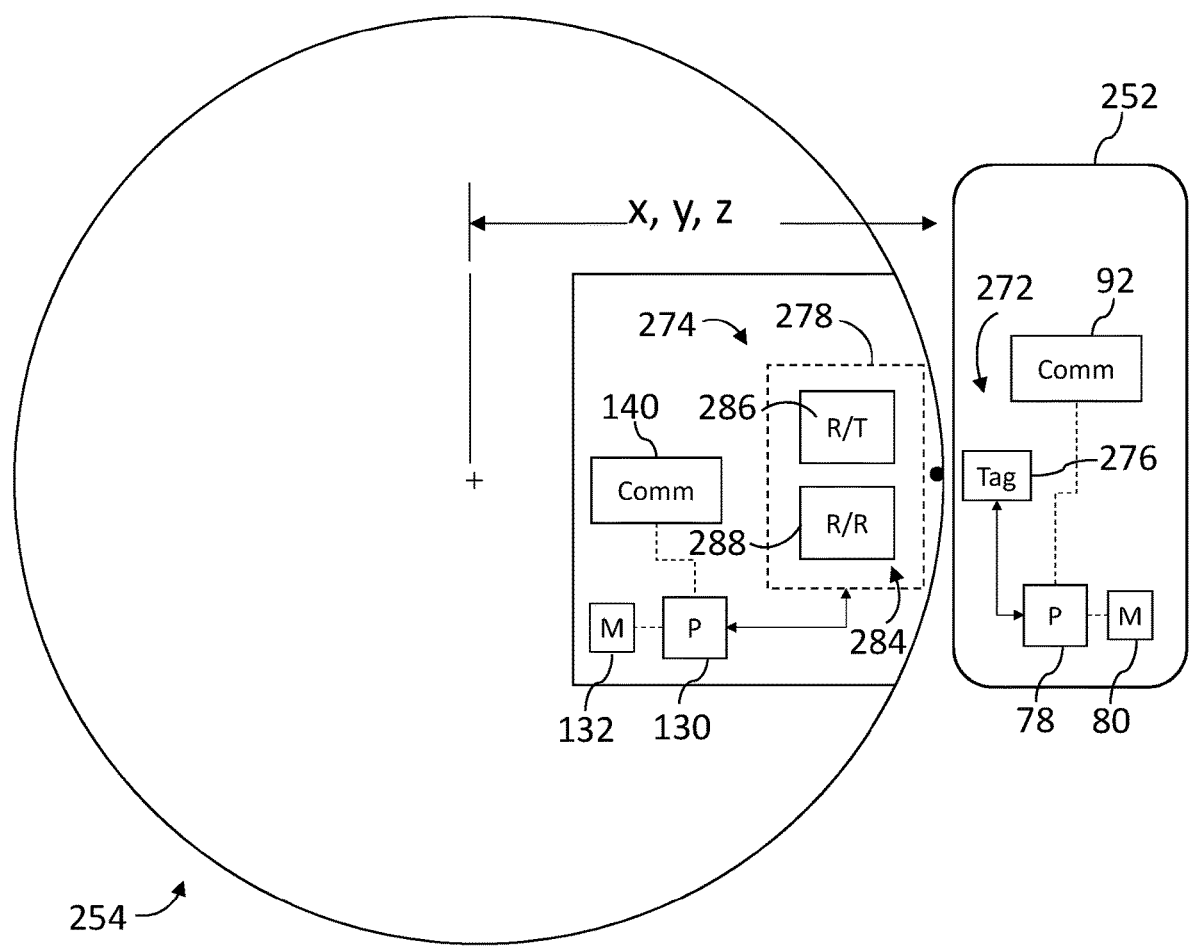
FIG. 24 is a schematic illustration of a laser scanner and hand scanner for the system of FIG. 23.

Referring now to FIG. 23 and FIG. 24, an embodiment of a system 250 is shown. The system 250 includes a 2D scanner 252 and a 360° image device 254. The 2D scanner 252 is similar 2D scanner 22 described herein, but also includes a position indicator 272. Similarly, the device 254 is similar to the device 24 described herein, but also includes a position indicator 274. The position indicator 272 cooperates with the position indicator 274 to determine when the scanner 252 is in a predetermined position and orientation relative to the device 254. In an embodiment, when the position indicators 272, 274 are engaged, the system 250 determine and record the position of the device 254 on the 2D map generated by the scanner 252. Once the device 254 is registered to the scanner 252 and the location determined, the 360° image acquired by the device 254 may be annotated onto the 2D map directly without having to match planes of the image to the lines on the 2D map.

In the embodiment of FIG. 24, an embodiment is shown of the system 250 using near field communications (NFC) for the position indicators 272, 274. A near field communications system typically consists of a tag 276 and a reader 278. The tag 276 and reader 278 are typically coupled to separate devices or objects and when brought within a predetermined distance of each other, cooperate to transfer data therebetween. It should be appreciated that while embodiments herein describe the tag 276 as being mounted within or coupled to the body of the 2D scanner 252 and the reader 278 as being disposed within the housing of the device 254, this is for exemplary purposes and the claims should not be so limited. In other embodiments, the arrangement of the tag 276 and reader 278 may be reversed.

As used herein, the term "near field communications" refers to a communications system that allows for a wireless communications between two devices over a short or close range, typically less than 5 inches (127 millimeters). NFC further provides advantages in that communications may be established and data exchanged between the NFC tag 276 and the reader 278 without the NFC tag 276 having a power source such as a battery. To provide the electrical power for operation of the NFC tag 276, the reader 278 emits a radio frequency (RF) field (the Operating Field). Once the NFC tag 276 is moved within the operating field, the NFC tag 276 and reader 278 are inductively coupled, causing current flow through an NFC tag antenna. The generation of electrical current via inductive coupling provides the electrical power to operate the NFC tag 276 and establish communication between the tag and reader, such as through load modulation of the Operating Field by the NFC tag 276. The modulation may be direct modulation, frequency-shift keying (FSK) modulation or phase modulation, for example. In one embodiment, the transmission frequency of the communication is 13.56 megahertz with a data rate of 106-424 kilobits per second.

In an embodiment, the 2D scanner 30 includes a position indicator 272 that includes the NFC tag 276. The NFC tag 276 may be coupled at a predetermined location of the body of the 2D scanner 30. In an embodiment, the NFC tag 276 is coupled to the side of the 2D scanner 30 to facilitate the operator 280 placing the NFC tag 276 adjacent the device 254 (FIG. 23). In an embodiment, the NFC tag 276 is coupled to communicate with the processor 78. In other embodiments, the NFC tag 276 is a passive device that is not electrically coupled to other components of the 2D scanner 30. In the exemplary embodiment, the NFC tag 276 includes data stored thereon, the data may include but is not limited to identification data that allows the 2D scanner 252 to be uniquely identified (e.g. a serial number) or a communications address that allows the device 254 to connect for communications with the 2D scanner 252.

In one embodiment, the NFC tag 276 includes a logic circuit that may include one or more logical circuits for executing one or more functions or steps in response to a signal from an antenna. It should be appreciated that logic circuit may be any type of circuit (digital or analog) that is capable of performing one or more steps or functions in response to the signal from the antenna. In one embodiment, the logic circuit may further be coupled to one or more tag memory devices configured to store information that may be accessed by logic circuit. NFC tags may be configured to read and write many times from memory (read/write mode) or may be configured to write only once and read many times from tag memory (card emulation mode). For example, where only static instrument configuration data is stored in tag memory, the NFC tag may be configured in card emulation mode to transmit the configuration data in response to the reader 278 being brought within range of the tag antenna.

In addition to the circuits/components discussed above, in one embodiment the NFC tag 276 may also include a power rectifier/regulator circuit, a clock extractor circuit, and a modulator circuit. The operating field induces a small alternating current (AC) in the antenna when the reader 278 is brought within range of the tag 276. The power rectifier and regulator converts the AC to stable DC and uses it to power the NFC tag 276, which immediately "wakes up" or initiates operation. The clock extractor separates the clock pulses from the operating field and uses the pulses to synchronize the logic, memory, and modulator sections of the NFC tag 276 with the NFC reader 278. The logic circuit separates the 1's and 0's from the operating field and compares the data stream with its internal logic to determine what response, if any, is required. If the logic circuit determines that the data stream is valid, it accesses the memory section for stored data. The logic circuit encodes the data using the clock extractor pulses. The encoded data stream is input into the modulator section. The modulator mixes the data stream with the operating field by electronically adjusting the reflectivity of the antenna at the data stream rate. Electronically adjusting the antenna characteristics to reflect RF is referred to as backscatter. Backscatter is a commonly used modulation scheme for modulating data on to an RF carrier. In this method of modulation, the tag coil (load) is shunted depending on the bit sequence received. This in turn modulates the RF carrier amplitude. The NFC reader detects the changes in the modulated carrier and recovers the data.

In an embodiment, the NFC tag 276 is a dual-interface NFC tag, such as M24SR series NFC tags manufactured by ST Microelectronics N.V. for example. A dual-interface memory device includes a wireless port that communicates with an external NFC reader, and a wired port that connects the device with another circuit, such as processor 78. The wired port may be coupled to transmit and receive signals from the processor 78 for example. In another embodiment, the NFC tag 276 is a single port NFC tag, such as MIFARE Classic Series manufactured by NXP Semiconductors. With a single port tag, the tag 276 is not electrically coupled to the processor 78.

It should be appreciated that while embodiments herein disclose the operation of the NFC tag 276 in a passive mode, meaning an initiator/reader device provides an operating field and the NFC tag 276 responds by modulating the existing field, this is for exemplary purposes and the claimed invention should not be so limited. In other embodiments, the NFC tag 276 may operate in an active mode, meaning that the NFC tag 276 and the reader 278 may each generate their own operating field. In an active mode, communication is performed by the NFC tag 276 and reader 278 alternately generating an operating field. When one of the NFC tag and reader device is waiting for data, its operating field is deactivated. In an active mode of operation, both the NFC tag and the reader device may have its own power supply.

In an embodiment, the reader 278 is disposed within the housing of the device 254. The reader 278 includes, or is coupled to a processor, such as processor 130 coupled to one or more memory modules 132. The processor 130 may include one or more logical circuits for executing computer instructions. Coupled to the processor 130 is an NFC radio 284. The NFC radio 284 includes a transmitter 286 that transmits an RF field (the operating field) that induces electric current in the NFC tag 276. Where the NFC tag 276 operates in a read/write mode, the transmitter 286 may be configured to transmit signals, such as commands or data for example, to the NFC tag 276.

The NFC radio 284 may further include a receiver 288. The receiver 288 is configured to receive signals from, or detect load modulation of, the operating field by the NFC tag 276 and to transmit signals to the processor 264. Further, while the transmitter 286 and receiver 288 are illustrated as separate circuits, this is for exemplary purposes and the claimed invention should not be so limited. In other embodiments, the transmitter 286 and receiver 284 may be integrated into a single module. The antennas being configured to transmit and receive signals in the 13.56 megahertz frequency.

As is discussed in more detail herein, when the 2D scanner 252 is positioned relative to the device 254, the tag 276 may be activated by the reader 278. Thus the position of the 2D scanner 252 relative to the device 254 will be generally known due to the short transmission distances provided by NFC. It should be appreciated that since the position of the tag 276 is known, and the position of the reader 278 is known, this allows the transforming of coordinates in the device coordinate frame of reference (e.g. point cloud data generated via photogrammetry) into the 2D scanner coordinate frame of reference.

It should be appreciated that while embodiments herein refer to the position indicators 272, 274 as utilizing NFC elements, this is for exemplary purposes and the claims should not be so limited. In other embodiments, the position indicators 272, 274 may be any suitable mechanical, electromechanical, magnetic or optical arrangement that allows the respective processors to determine the 2D scanner and the device are in a predetermined position and pose relative to each other. In an embodiment, the position indicators 272, 274 may include those position indicators described in commonly owned and copending U.S. application Ser. No. 15/713,931, the contents of which are incorporated herein by reference.

Terms such as processor, controller, computer, DSP, FPGA are understood in this document to mean a computing device that may be located within the system 30 instrument, distributed in multiple elements throughout the system, or placed external to the system (e.g. a mobile computing device).

Figure 25:
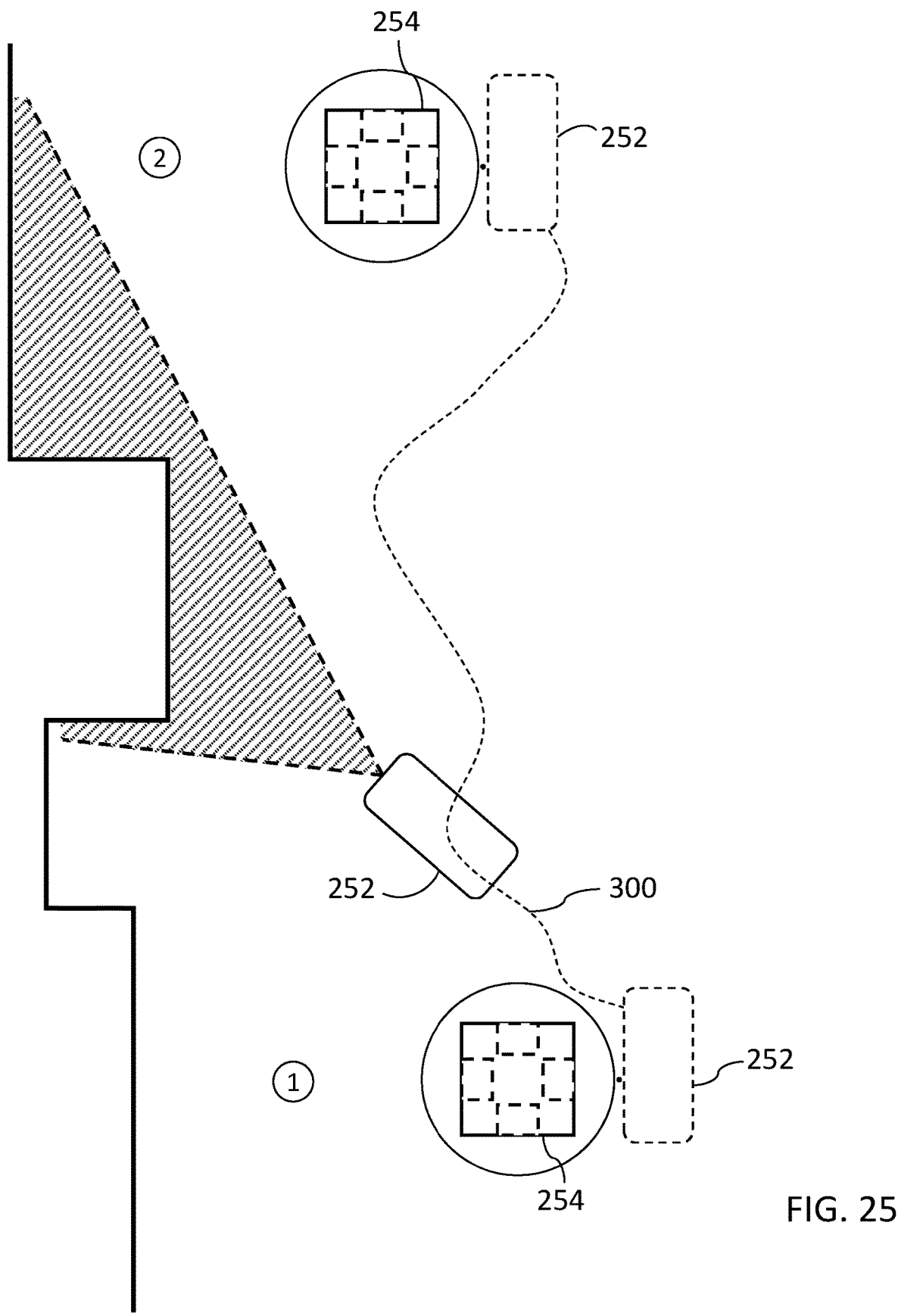
FIG. 25 is a schematic illustration of the operation of the system of FIG. 23.

Referring now to FIG. 25, an example of the operation of the system 250 is illustrated. The operator 280 initiates operation of the 2D scanner 252 and places the scanner 252 next to the device 254 to engage the position indicators 272, 274. At this point, the position of the device 254 (e.g. position 1) is registered to the 2D scanner 252 and the position of the device 254 may be indicated on the 2D map generated from the data acquired by the 2D scanner 252. While in the first position, the device 254 acquires a first 360° image of the environment. It should be appreciated that the operation device 252 to acquire a 360° image may be performed before or after the initiation of the 2D scanner 252.

The operator 280 then proceeds to move the 2D scanner 252 along a path 300 to scan the environment. As the 2D scanner 252 moves along the path 300, a 2D map of the environment is generated, such as by using the aforementioned methods described herein. The operator continues to move the 2D scanner 252 along the path 300 to a second position spaced apart from the initial or first position. It should be appreciated that the illustrated path 300 is exemplary and not intended to be limited, the path 300 may be any suitable path that allows the operator to scan the environment or regions of interest within the environment. The device 254 is moved from the first position to the second position. It should be appreciated that the movement of the device 254 may occur when the 2D scanner 252 is located at the second position, or may be moved simultaneously as the 2D scanner 252 is moved along the path 300.

In an embodiment, while the 2D scanner 252 and the device 254 are in the second position, two actions may occur. The first step is the acquisition of a second 360° image of the environment by the device 254. The second step includes having the operator 280 place the scanner 252 next to the device 254 to engage the position indicators 272, 274. At this point, the position of the device 254 (e.g. position 2) is registered to the 2D scanner 252 and the position of the device 254 may be indicated on the 2D map generated from the data acquired by the 2D scanner 252.

As discussed above, the first 360° image and the second 360° image may be linked to the 2D map, with the links being located at the position on the 2D map where the respective 360° image was acquired. In another embodiment, the first 360° image and the second 360° image may be used to generate a 3D point cloud of the environment photogrammetric techniques using feature matching in the areas of overlap in the field of view of the device 254 in the first position and the second position. In one embodiment, dense image matching is used to generate the 3D point cloud.

Figure 27:
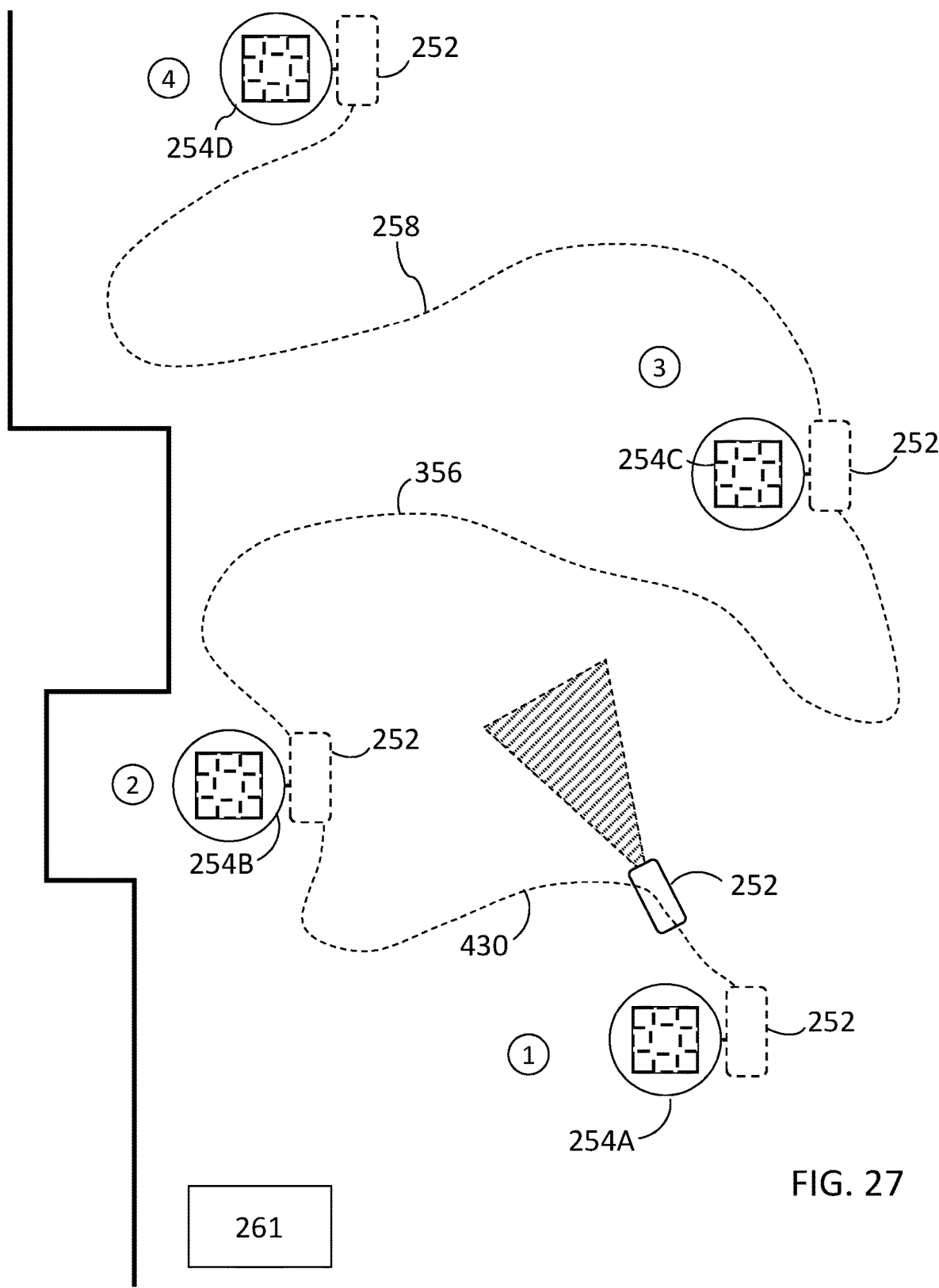
FIG. 27 is a schematic illustration of a system of FIG. 23 using 2D scanner and acquiring 360° images in multiple locations in accordance with another embodiment.

Referring now to FIGS. 26-27 a method 400 is shown of the operation of the system 250 where multiple devices 254 are used. The method 400 begins in block 402 with the device 254A acquiring a first 360° image at a first position (location "1" of FIG. 26). The method 400 then proceeds to block 404 where the 2D scanner 252 is moved adjacent the device 254 such that the position indicator 272 engages the position indicator 274. In the embodiment of FIG. 24, the placement of the tag 276 within range of the reader 278 allows the registration of the device 254 to the 2D scanner 252, and thus the location of the first 360° image is known on the 2D map generated by the 2D scanner 252. In an embodiment, data is also transferred between the device 254A and the 2D scanner 252. The transferred data may include but is not limited to an identification data of the device 254A and the first 360° image for example. Once the device 254 is registered to the 2D scanner 252, the method 400 then proceeds to block 406 where the 2D scanner 252 is activates. In one embodiment, the 2D scanner 252 is automatically activated by the registration, such as via a signal from the device communications circuit 140 to the 2D scanner communications circuit 92 or via NFC. In an embodiment, the 2D scanner 252 continuously scans until the device 254B and the 2D scanner 252 are registered a second time.

In block 406, the operator 280 scans the environment by moving the 2D scanner 252 along a path 430. The 2D scanner acquires 2D coordinate data of the environment as it is moved along the path 430 in the manner described herein. It should be appreciated that the 2D coordinate data (e.g. the 2D map) is generated in a local coordinate frame of reference of the 2D scanner 252.

The method 400 then proceeds to block 407 where a second 360° image is acquired a second position (e.g. location "2" of FIG. 26). The method 400 then proceeds to block 408 where the 2D scanner 252 is once again moved adjacent the device 254B (at the second position) to engage the position indicator 272 and position indicator 274. The engagement of the position indicators 272, 274, registers the position and orientation of the device 254 relative to the 2D scanner 252. In an embodiment, this second registration of the 2D scanner 252 causes the 2D scanner 252 to stop scanning. In an embodiment, blocks 407, 408 are reversed and the registration of the 2D scanner 252 causes the device 254B to automatically acquire the second 360° image.

In an embodiment, the 360° image data acquired at a position is transferred in block 410 from the device 254 to the 2D scanner 252. In another embodiment, the 360° image data is transferred to a remote computer, such as computer 261 for example, and integrated with the 2D map after the scanning by the 2D scanner 252 is completed.

With the 2D scanner 30 registered, the method 400 then proceeds to block 412, where blocks 407, 408 (and optionally block 410) are repeated for a third position (e.g. location "3" in FIG. 27) where the 2D scanner 252 is registered to device 254C and a fourth position (e.g. location "4" in FIG. 27) where 2D scanner 252 is registered to device 252D. It should be appreciated that the device 254C acquires a third 360° image and the device 254D acquires a fourth 360° image.

In an embodiment where the 360° images are used to generate a point cloud, once the scanning with the 2D scanner 252 is completed and the 360° images are acquired, the method 400 proceeds to block 414 where the point cloud data (which is in the local coordinate system of the respective device 254 that acquired the image) is transformed into the coordinate system of the 2D scanner 252. As a result, the 3D point cloud data may be associated with locations on the 2D map in block 416.

Technical effects and benefits of some embodiments include providing a system that allows the rapid generation of a 2D map of an environment that has been annotated with 360° images or a point cloud. Further technical effects and benefits is to allow for registering a location of a 360° camera device with a 2D scanner and the rapid noncontact acquisition of a dense point cloud using photogrammetry.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of generating a two-dimensional (2D) image of an environment, the method comprising:
acquiring, via a 2D scanner, a plurality of 2D coordinates of points on surfaces in the environment, the 2D scanner having a light source and an image sensor, the image sensor being arranged to receive light reflected from object points;
generating, via the 2D scanner, a signal in response a change in position or orientation of the 2D scanner;
acquiring at a first position of the environment a first 360° image, via a movable platform having a 360° camera, the 360° camera having a plurality of cameras and a controller, the controller being operable to merge the images acquired by the plurality of cameras to generate an image having a 360° view in a horizontal plane, the 360° camera being movable from the first position to a second position on the movable platform;
generating a 2D map based at least in part on an activation signal from an operator, the plurality of two-dimensional coordinates of points, and the signal; and
integrating the first 360° image with the 2D map;
acquiring a second 360° image with the 360° camera at the second position;
registering the first 360° image with the second 360° image; and
generating a point cloud based at least in part on the registration of the first 360° image with the second 360° image and the locations of the first 360° image and the second 360° image on the 2D map.

2. The method of claim 1, wherein the 2D scanner being sized and weighted to be carried and operated by a single person.

3. The method of claim 1, further comprising measuring one or more parameters with an inertial measurement unit, wherein the registration is based at least in part on the one or more parameters.

4. The method of claim 1, wherein the point cloud is generated using dense image matching.

5. The method of claim 1, further comprising creating an electronic link between the point cloud and the 2D map.

6. The method of claim 1, further comprising:
scanning, via the 2D scanner, light over an angle and simultaneously measures an angle value and corresponding distance value to each of the illuminated object points.

7. The method of claim 1, wherein the first 360° image is a spherical projection or a cylindrical projection.

8. A method for scanning an environment and generating an annotated two-dimensional (2D) map, the method comprising:
determining, via a 2D scanner, a distance value to at least one of object points in the environment, the 2D scanner having a light source and an image sensor, the light source steering a beam of light to illuminate the object points, the image sensor being arranged to receive light reflected from the object points;
generating, via the 2D scanner, a signal in response a change in position or orientation of the 2D scanner;
generating, via a 360° camera having a plurality of cameras, a first 360° image having a 360° field of view in a horizontal plane;
generating a 2D map of the environment in response to an activation signal from an operator and based at least in part on the distance value and the signal, wherein the generating the 2D map includes generating a grid map that includes a plurality of cells, each of the plurality of cells indicating a probability of a cell area being occupied;

integrating the 360° image with the 2D map at a location on the 2D map that corresponds to the location where the first 360° image was acquired; and generating a point cloud based at least in part on the acquisition of at least two 360° images.

9. The method of claim 8, further comprising:
extracting planes from the first 360° image; and
matching planes in the first 360° image with lines on the 2D map.

10. The method of claim 8, further comprising:
acquiring a second 360° image with the 360° camera; and
registering the first 360° image with the second 360° image.

11. The method of claim 10, further comprising generating a point cloud based at least in part on the registration of the first 360° image with the second 360° image and the locations of the first 360° image and second 360° image on the 2D map.

12. The method of claim 11, wherein the generation of the point cloud is further based at least in part on dense image matching.

13. The method of claim 8, wherein the first 360° image is a spherical projection or a cylindrical projection.

14. A non-transitory computer readable medium storing instructions that, when executed by one or more processors of a system perform the steps of:

acquiring, via a 2D scanner, a plurality of 2D coordinates of points on surfaces in the environment, the 2D scanner having a light source and an image sensor, the light source steering a beam of light to illuminate object points in the environment, the image sensor being arranged to receive light reflected from the object points;

generating, via the 2D scanner, a signal in response a change in position or orientation of the 2D scanner;

acquiring at a first position of the environment a first 360° image, via a movable platform having a 360° camera, the 360° camera having a plurality of cameras and a controller, the controller being operable to merge the images acquired by the plurality of cameras to generate an image having a 360° view in a horizontal plane, the 360° camera being movable from the first position to a second position on the movable platform;

generating a 2D map based at least in part on an activation signal from an operator, the plurality of two-dimensional coordinates of points, and the signal;

integrating the first 360° image with the 2D map;

acquiring a second 360° image with the 360° camera at the second position;

registering the first 360° image with the second 360° image; and generating a point cloud based at least in part on the registration of the first 360° image with the second 360° image and the locations of the first 360° image and the second 360° image on the 2D map.

* * * * *